United States Patent
Lee

(10) Patent No.: US 8,528,486 B2
(45) Date of Patent: Sep. 10, 2013

(54) DYNAMIC MAGNETIC SUSPENSION PROPELLER

(75) Inventor: Kwang Hwee Lee, Hong Kong (CN)

(73) Assignee: China Sight Corporation Limited, Hong Kong (CN)

(*) Notice: Subject to any disclaimer, the term of this patent is extended or adjusted under 35 U.S.C. 154(b) by 232 days.

(21) Appl. No.: 13/124,665

(22) PCT Filed: Dec. 7, 2009

(86) PCT No.: PCT/CN2009/001380
§ 371 (c)(1),
(2), (4) Date: Apr. 17, 2011

(87) PCT Pub. No.: WO2010/054538
PCT Pub. Date: May 20, 2010

(65) Prior Publication Data
US 2011/0277659 A1 Nov. 17, 2011

(30) Foreign Application Priority Data
Oct. 17, 2008 (CN) .......................... 2008 1 0216881
Jun. 19, 2009 (CN) .......................... 2009 1 0149930

(51) Int. Cl.
*B60L 13/04* (2006.01)
(52) U.S. Cl.
USPC .......................... 104/281; 104/282; 104/284
(58) Field of Classification Search
USPC .................................................. 104/281–284
See application file for complete search history.

(56) References Cited

U.S. PATENT DOCUMENTS

| 5,317,976 | A | * | 6/1994 | Aruga et al. | 104/282 |
| 5,605,100 | A | * | 2/1997 | Morris et al. | 104/284 |
| 6,510,799 | B2 | * | 1/2003 | Lamb et al. | 104/281 |
| 6,827,022 | B2 | * | 12/2004 | van den Bergh et al. | 104/284 |
| 7,587,982 | B2 | * | 9/2009 | Li et al. | 104/281 |
| 7,836,829 | B2 | * | 11/2010 | Burger | 104/281 |
| 2003/0205163 | A1 | * | 11/2003 | Lamb et al. | 104/282 |
| 2004/0182275 | A1 | * | 9/2004 | Frank et al. | 104/286 |
| 2004/0261649 | A1 | * | 12/2004 | Guardo, Jr. | 104/284 |
| 2006/0219128 | A1 | * | 10/2006 | Li | 104/284 |
| 2006/0243157 | A1 | * | 11/2006 | Li | 104/281 |
| 2007/0089636 | A1 | * | 4/2007 | Guardo, Jr. | 104/281 |
| 2007/0095245 | A1 | * | 5/2007 | Li | 104/284 |

FOREIGN PATENT DOCUMENTS
CN 2598248 Y 1/2004
WO 2007/021206 A1 2/2007

* cited by examiner

*Primary Examiner* — Jason C Smith

(57) ABSTRACT

A dynamic magnetic suspension propeller includes an separate body electromotor and an external force to reversely rotate the separate body electromotor. The separate body electromotor includes a stator and a rotor mounted separately, wherein the stator includes a single layer plane magnetic path having magnetism, the rotor includes a cantilever electromagnet having a first pole provided at an end portion of the cantilever and a second pole provided at a rotating shaft close to the cantilever, wherein the electromagnet is reversely rotated by the external force around the rotating shaft with respect to the stator, so as to produce a countertorque with respect to an magnetic force of the stator, wherein the countertorque includes a magnetic suspension force and a magnetic propelling force.

16 Claims, 21 Drawing Sheets

2A  2B  2C  2D  2E 3A  3B  3C 4A  4B  4C  4D

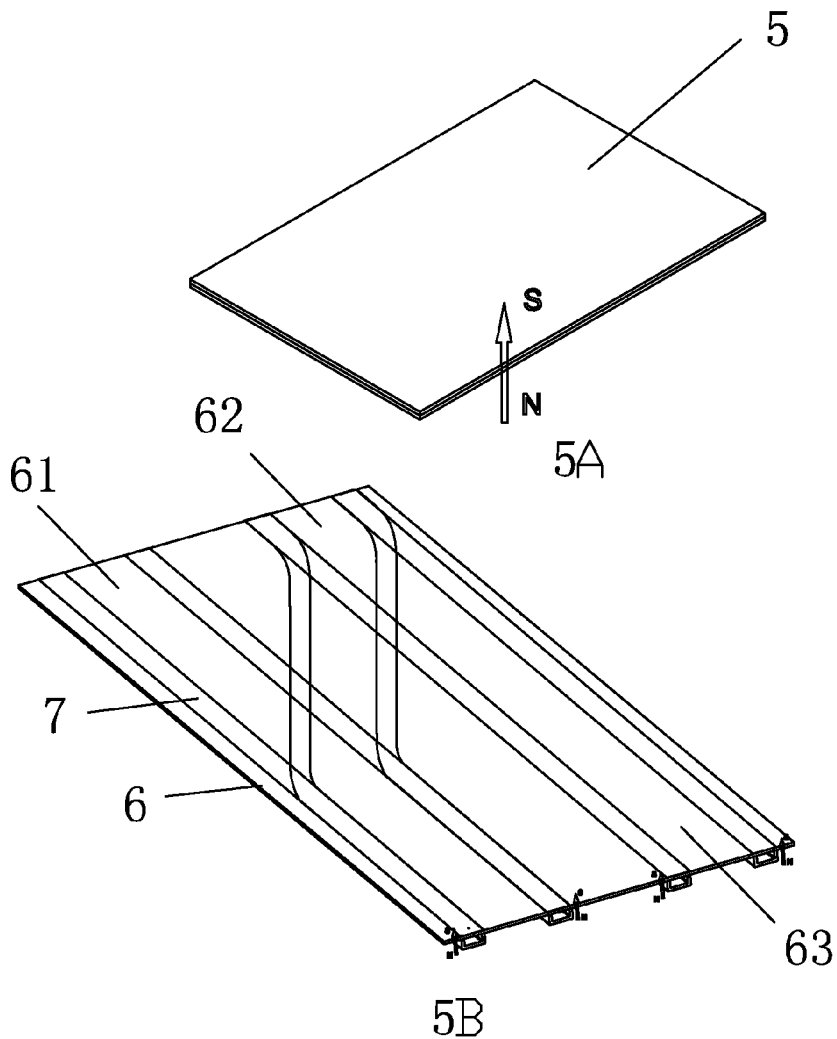
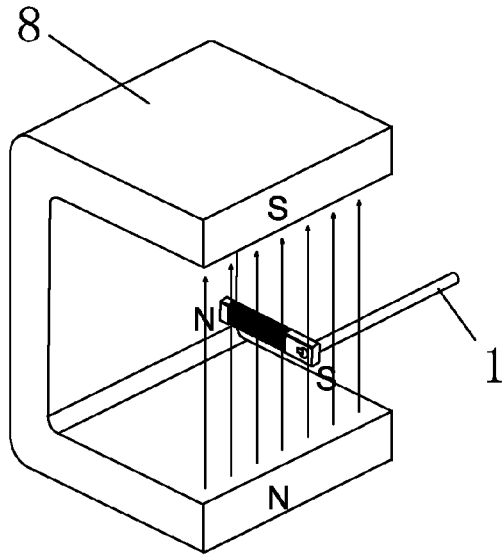
Fig. 5
Fig. 6

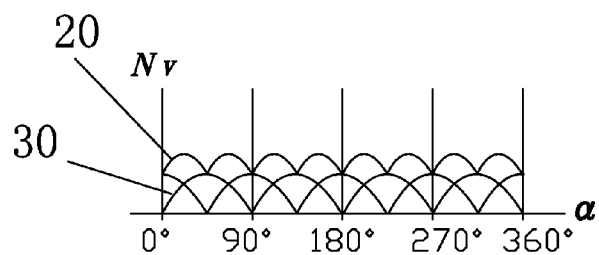
Fig. 22
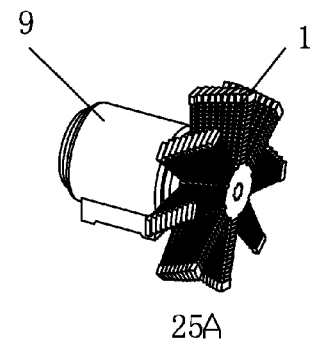
25A
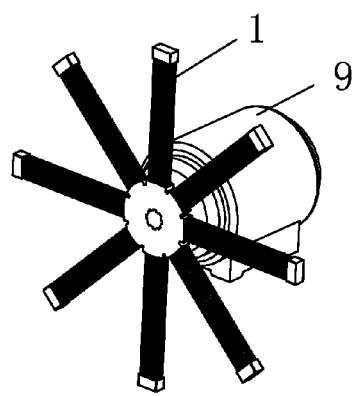
Fig. 23
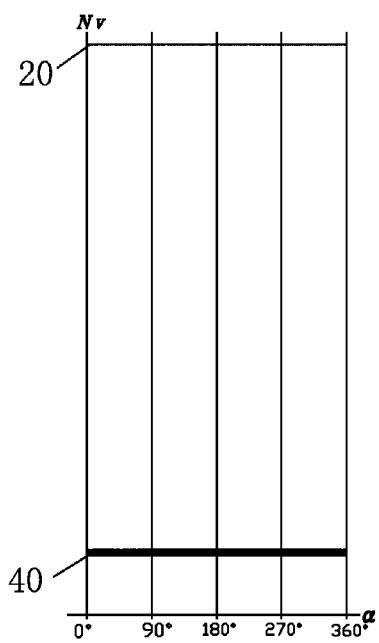
25B
Fig. 25
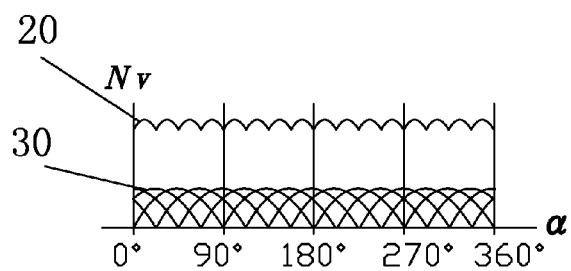
Fig. 24

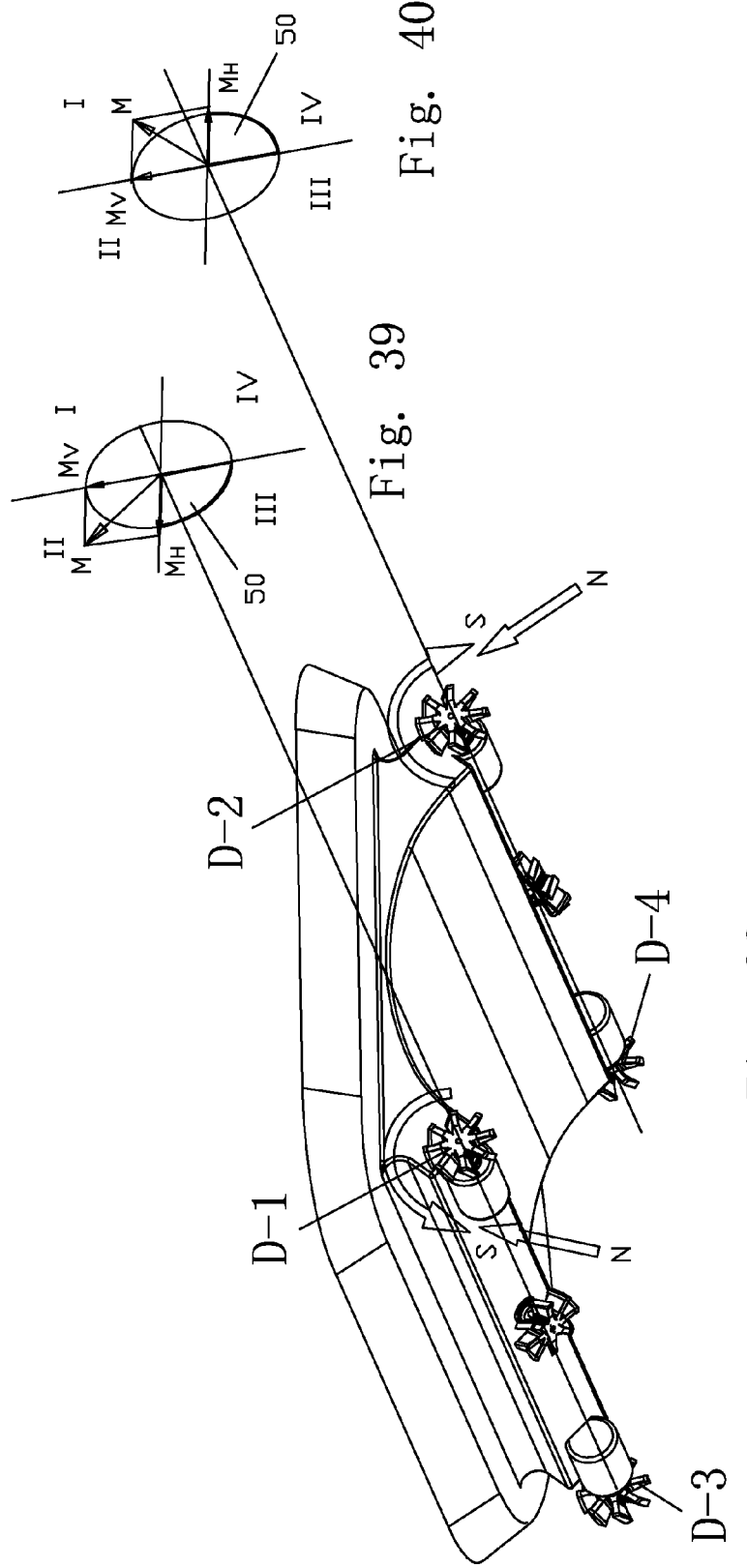

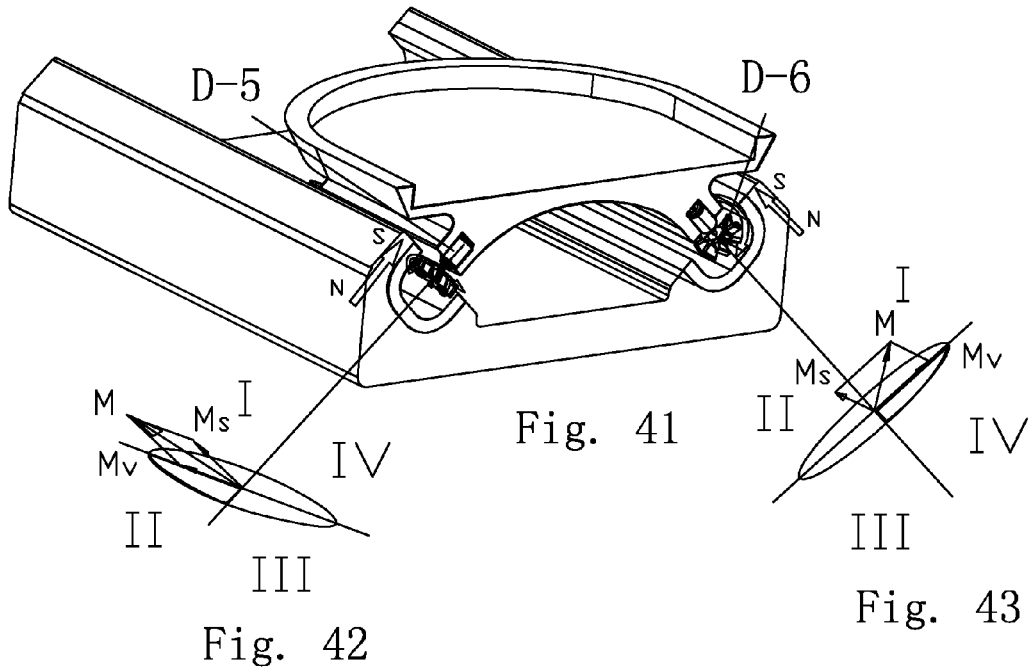
Fig. 41
Fig. 42
Fig. 43
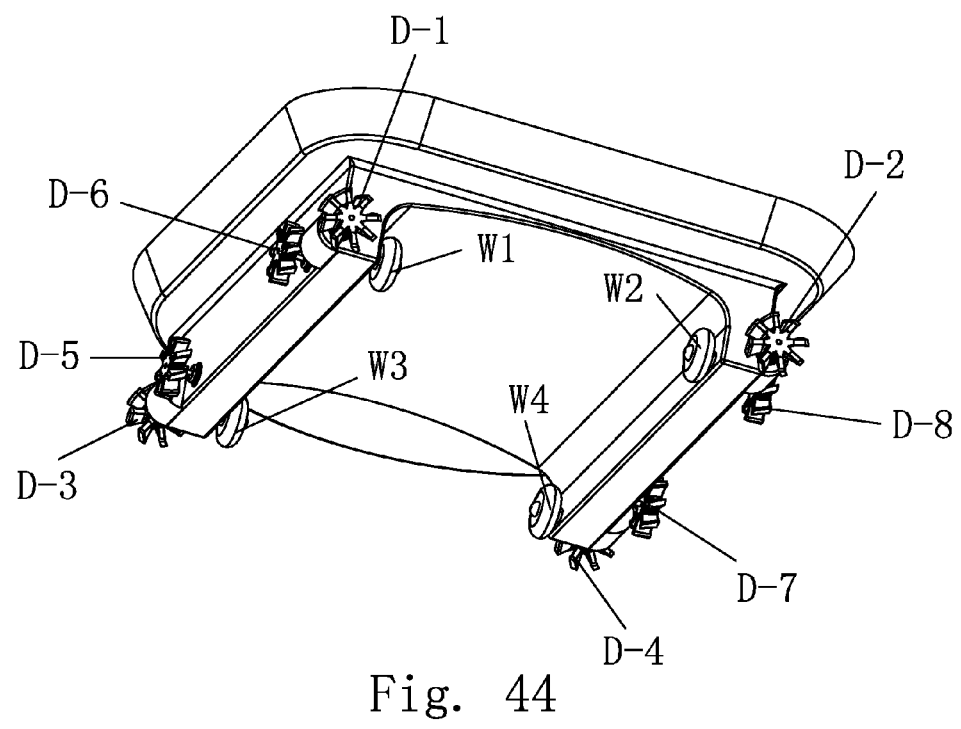
Fig. 44

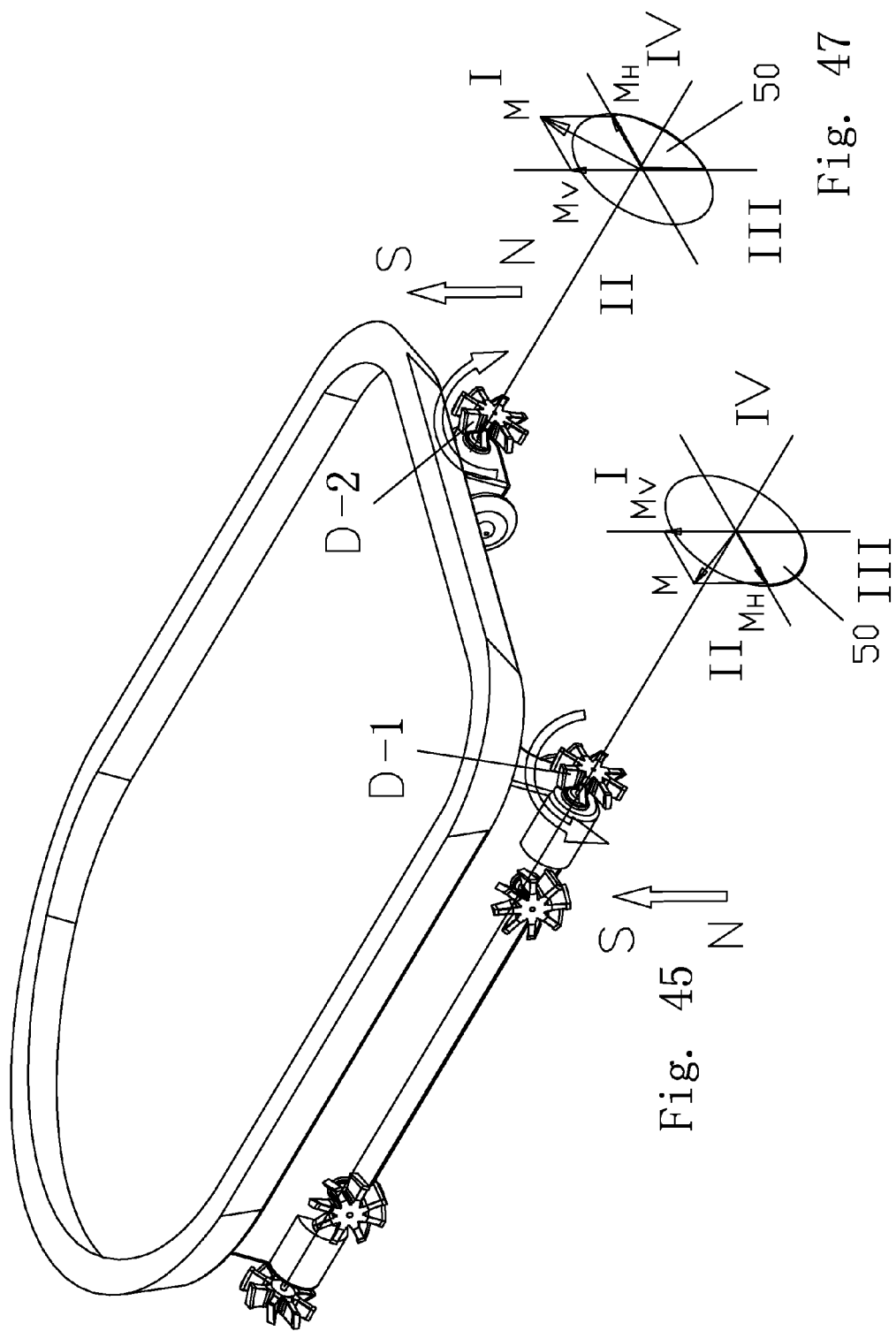

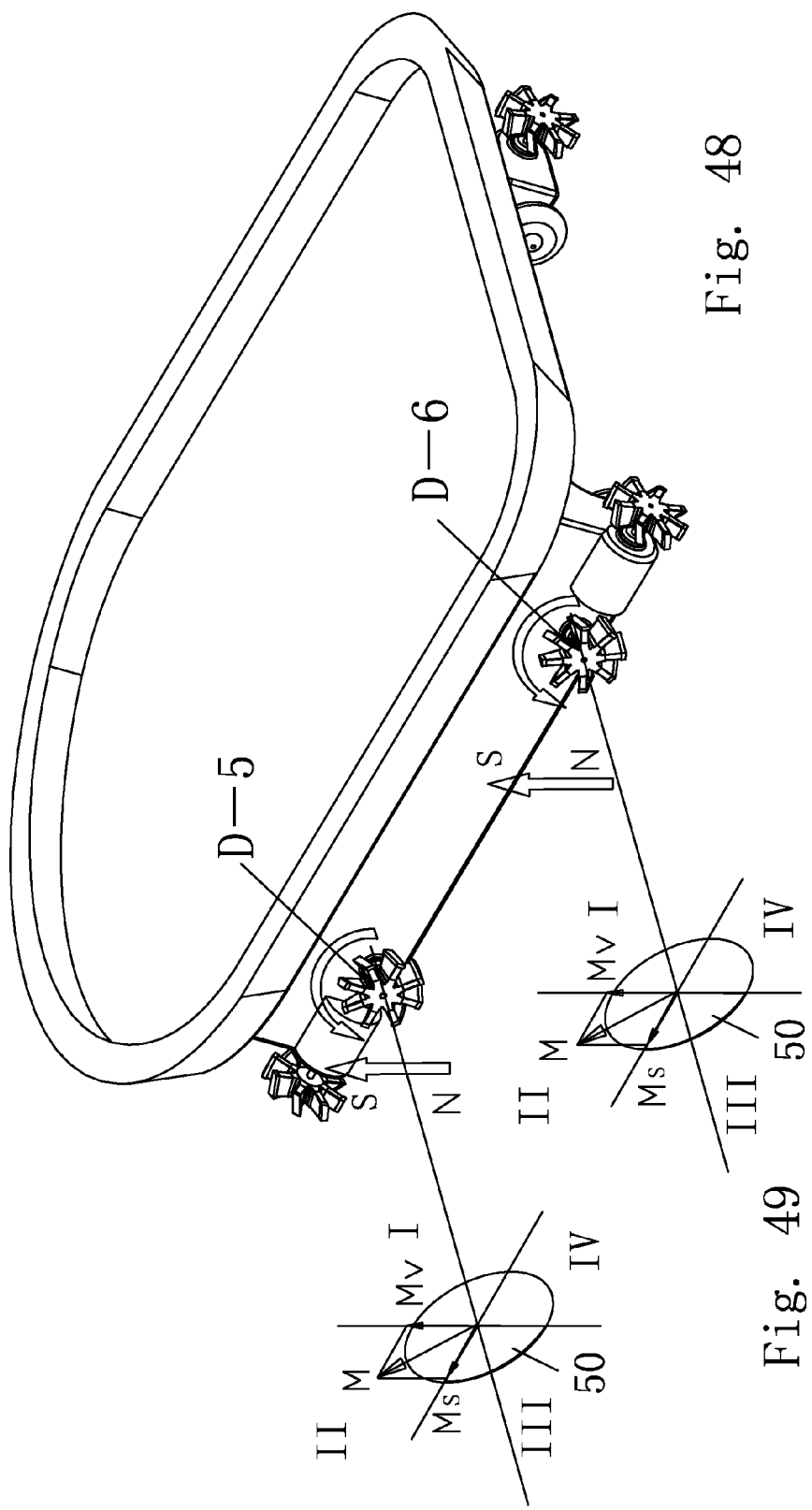

DYNAMIC MAGNETIC SUSPENSION PROPELLER

BACKGROUND OF THE PRESENT INVENTION

1. Field of Invention

The present invention relates to magnetic suspension technology, and more particularly to a dynamic magnetic suspension propeller.

2. Description of Related Arts

Static magnetic force utilizes traditional electromagnetic theory, i.e., same poles repel each other wile opposite poles attract each other. In other words, there is no other energy anticipating to suspend the train without electromagnetic force. As a result, to provide sufficient electromagnetic force, the electromagnet must be very large and heavy. Additionally, the static magnetic force can not maintain stable suspension manner, so powerful electromagnetic induction protecting wall must be assembled on two sides of the train to avoid accidents caused by its left and right swaying. Therefore, a static magnetic force suspension train does not only consume a great deal of energy, but also introduce a very large driving system. According to reports, the static magnetic suspension train consumes tens of energy than plane per passenger, and needs 13,000 tons concrete and 3,700 tons copper per kilometer, and the ratio of people to train, protecting wall on two sides excluded, is up to one ton per passenger. The static magnetic suspension trains have the following common drawbacks: complicated and overstaffed structure, large weight, high cost, high energy consuming, high maintaining fee, low economic efficiency. And further, its safety is still questioned.

Since 1960s, some advanced countries have spent plenty of human and material resources to research of magnetic suspension trains. However, more than 50 years have passed, it still remains in research. The key problem of magnetic suspension trains is to suspend the trains. For a long period, only theory of static magnetic force is adopted. The German produce suspension force by way of repelling magnets of opposite polarities, while the Japanese by way of attracting magnets of same polarities. To suspend the trains on desired position, much protecting action must be taken, which is due to the inherent drawback of unstableness of static magnetic fields and is also the reason that the existing magnetic suspension trains are large and energy-consuming.

Traditional magnetic suspension trains utilize the basic character of magnetomechanics that same poles repelling and opposite poles attracting as there working principle. In other words, the suspension force of the magnetic suspension train comes from the potential energy between the intensity of magnetization of the magnet on the train and the intensity of magnetization of the rail. The value of magnetic suspension force can be expressed by the following formula:

magnetic suspension force $F1=K1*B1*B2$;

wherein $K1$ is a constant related to mechanical characters and materials;

wherein $B1$ is the intensity of magnetization of the magnet on the train;

wherein $B2$ is the intensity of magnetization of the rail.

The following references all adopt potential energy of magnetic field as the mechanical principle. Different from the magnetic suspension trains which use electromagnet to produce strong intensity of magnetization and achieve stableness of running trains, the three references use permanent magnet, and they have the same principle but do not appear in practice.

Reference 1: magnetic motor, Chinese Patent Application No. 02283714.0.

Its principle is that the permanent magnet assembled on magnetic suspension wings repels the permanent magnet on rails to suspend the train. And the train is maintained between two rails by the attraction between the quidinq electromagnet fixed on the train and the straight stator fixed in reinforcement ring of vacuum tube.

In mechanical principle, the reference utilizes the potential energy of magnetic field purely.

Reference 2: system of grooved rail of magnetic suspension-train structure technology, Chinese Patent Application No. 200510117177.0.

Its principle is that the permanent magnet assembled on two bottom sides of suspension driving cabin repels the corresponding permanent magnet on the bottom of grooved rails and the permanent magnet quidinq rail fixed on the grooved rails to suspend the train by the principle of opposite poles repelling to stabilize the suspension driving cabin.

In mechanical principle, the reference utilizes the potential energy of magnetic field purely.

Reference 3: magnetic motor, Chinese Patent Application No. 200620160690.8.

Its principle is that the driving source (motor) drives the magnetic wheel to roll along the magnetic rail, and is suspended by the repelling force between the magnetic wheel and the magnetic rail having the same pole. Additionally, quidinq, propelling and enhancing the suspension force is realized by the induction field produced by the magnetic wheel running with respect to the induction boards on two sides of the rail.

In mechanical principle, the reference utilizes the potential energy of magnetic field purely.

SUMMARY OF THE PRESENT INVENTION

An object of the present invention is to provide a dynamic magnetic suspension propeller, whose principle is reversely rotating a rotor of a separate body motor by external force to produce a countertorque on a rotating shaft of the motor, wherein a resultant force of perpendicular subtorque of the countertorque is the suspension force suspending a magnetic suspension train.

Accordingly, in order to accomplish the above objects, the present invention provides a dynamic magnetic suspension propeller, comprising an separate body electromotor and an external force to reversely rotate the separate body electromotor.

Particularly, the separate body electromotor comprises a stator and a rotor mounted separately, wherein the stator comprises a single layer plane magnetic path having magnetism, the rotor comprises a cantilever electromagnet having a first pole provided at an end portion of the cantilever and a second pole provided at a rotating shaft close to the cantilever, wherein the electromagnet is reversely rotated by the external force around the rotating shaft with respect to the stator, so as to produce a countertorque with respect to an magnetic force of the stator, wherein the countertorque comprises a magnetic suspension force and a magnetic propelling force.

The stator further comprises a channel steel shaped rail or a V shaped rail or a U shaped rail or a parabola shaped rail which have magnetism.

The rail is single rail type or double rails type or multiple rails type, wherein the rail is single line type or double lines type or multiple lines type, wherein the channel steel shaped rail is mounted with a channel bottom thereof as a datum plane which can be parallel or perpendicular or formed an angle to a horizontal.

The rotor comprises a plurality of cantilever electromagnets provided evenly on a plane of the rotating shaft to form a disk electromagnet.

The rotor comprises a plurality of disk electromagnets connected in series overlappedly and staggeredly.

The rotating shaft of the rotor can be parallel to or laterally perpendicular to or laterally formed an angle with the rail lengthways.

The external force comprises rotating the rotor reversely with a conventional motor, wherein the conventional motor and the rotor have the same rotating shaft.

The external force comprises rotating the rotor reversely with the conventional motor via a gearing.

The magnetic suspension force and a magnetic propelling force comprises rotating the rotor reversely under the external force, when the rotating shaft of the rotor produces a countertorque which is separated into a horizontal subtorque and a perpendicular subtorque. After eliminating the horizontal subtorque, the perpendicular subtorque is the magnetic suspension force, and after eliminating the perpendicular subtorque, the horizontal subtorque is the magnetic propelling force.

A magnetism of the stator can be realized by permanent magnet type, traditional electromagnet type or electromagnetic induction by synchronical moving.

The electromagnetic induction by synchronical moving has a magnetic field of a magnetic path provided by a permanent electromagnet fixed on the magnetic suspension train.

The electromagnetic induction by synchronical moving has a magnetic field of a magnetic path provided by a electromagnet fixed on the magnetic suspension train.

The electromagnetic induction by synchronical moving has a magnetic field of a magnetic path provided by a conductive coil on the magnetic suspension train, and magnetic lines of force form an integrated magnetic loop via the rail.

The rotor comprises a magnetic force transferred rotor.

The magnetic force transferred rotor consists of a rotating canister and a magnet mounting on a frame, wherein the magnet is positioned on an inner side of the rotating canister, and magnetic lines of force thereof pass through an air gap into the rotating canister and then return to another pole of the magnet to form an integrated magnetic loop.

A magnetic source of the magnetic force transferred rotor can be electromagnet or permanent magnet.

The rotating canister of the magnetic force transferred rotor comprises a canister shaped object made by a non-iron magnetic material, and a plurality of fan-shaped embedded blocks, which are made of iron magnetic material, are mounted evenly on the canister.

The rotating canister of the magnetic force transferred rotor can be assembled by a plurality of disks which have a plurality of fan-shaped embedded blocks of iron material evenly mounted on the canister.

The present invention has the following advantages: powerful magnetic suspension force, light structure, high efficiency, easy controlling, high safety, middle auto-aligning, low fabricating cost, low maintaining fee and high economic efficiency, and therefore can be a basis to develop lightweight magnetic suspension train. Both the magnetic suspension train and the magnetic path according to the present invention has a much lower fabricating cost than magnetic suspension trains of static magnetic force type. The present invention is adapted for developing magnetic suspension trains of small-scale, such as roadlouse, and the magnetic path can be magnetic rail or plane magnetic path. The new delivery system provide advantages for full-automatic controlling. Additionally, the dynamic magnetic suspension propeller can be developed into a new kind of recreation facility, which has high entertainment and economic effect.

BRIEF DESCRIPTION OF THE DRAWINGS

FIG. 1-69 include the basic schematic diagram and application sketch view of the present invention, wherein:

FIG. 69 is a sketch view of a magnetized range of the rotating canister changing with a position of a magnet.

Figure 1:
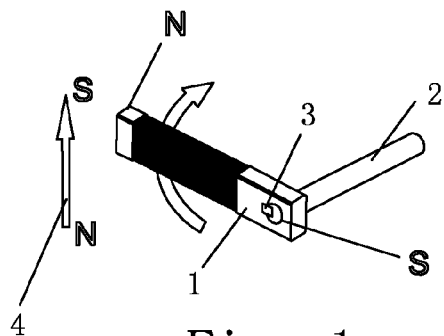

In the drawings, 1-cantilever electromagnet; 11-magnet; 12-magnetic loop between magnet and rotating canister; 13-direction of magnetic field on rotating canister; 14-rotating direction of external force; 15-countertorgue; 2-rotating shaft; 3-key; 4-direction of magnetic force line of stator; 41-electromagnetic disk; 42-electromagnetic induction coil frame; 43-electromagnetic induction coil; 44-magnet frame; 45-permanent magnet; 46-permanent magnet frame; 5-plane magnetic path; 6-plane board; 61-slow line; 62-turnoff; 63-fast line; 7-magnetic rail; 71-magnetic rail; 72-direction of magnetic field on magnetic rail; 8-groove-shaped magnet; 9-conventional motor; 91-non-magnetic material; 92-fan-shaped magnetic embedded block; 10-magnetic suspension train; 101-underpan of magnetic suspension train; 102-upper rail; 103-electromagnet frame; 104-electromagnet; 105-lower rail; 106-rail frame; 108-train rail; 20-NV synthesized curve; 30-NV curve of each electromagnet; 40-NV curve of each electromagnetic disk; 50-electrified range; 60-working range; 70-path and direction of magnetic loop; 80-motion propeller; 90-suspension force propeller; 100-landing wheel.

DETAILED DESCRIPTION OF THE PREFERRED EMBODIMENT

Referring to the drawings, a dynamic magnetic suspension propeller of the present invention is described as below.

A conventional motor rotates a rotor thereof in a manner of force couple, while a rotor of a separate body motor according to the present invention is rotated by a torque produced by a cantilever electromagnet, as referring to FIG. 1. When an external force forces the rotor of the separate body motor to rotate reversely, a countertorque is produced on a rotating shaft of the separate body motor, while a conventional motor produces only reverse force couple. The countertorque has a value in direct proportion to an intensity of magnetic induction between the rotor and a stator, and also in direct proportion to a length of a force arm of the rotor, i.e., a length of the cantilever electromagnet. When the external force forcibly makes the rotor rotate reversely, the countertorque on the rotating shaft is converted in to kinetic energy. Because a perpendicular subtorque of the countertorque is upward, a kinetic energy in a perpendicular direction after converting is the kinetic energy suspending the magnetic suspension train, wherein a rotating speed is higher, the suspending kinetic energy is larger. Therefore, a suspension force of the dynamic magnetic suspension propeller is not only related to the intensity of magnetic induction and the length of the force arm of the rotor, but also to the rotating speed of the reversely rotating external force. Actually, a magnetic induction force between the rotor and the stator is not a direct suspension force, but an instantaneous point bearing force that an end of the force arm of the rotor makes the rotating shaft turn up when the external force rotates the rotor reversely. The external force reversely rotating the rotor can adopt a conventional motor of low cost, light structure, safe and reliable, and efficiency higher than 85%. Most output power of the conventional motor is converted into the kinetic energy of the countertorque on the rotating shaft of the separate body motor.

The stator of the separate body motor acts as a "magnetic path" of the dynamic magnetic suspension train. The stator can be classified into two species of a rail type and a plane magnetic path type. Rails of the rail type can have sections of different shapes, as illustrated in FIG. 2-5.

I. Working Principle of the Dynamic Magnetic Suspension Propeller

A. Basic Structure of the Separate Body Motor

The dynamic magnetic suspension propeller utilizes the external force to rotate the rotor of the separate body motor reversely, so as to obtain the suspension force by producing the countertorque on the rotating shaft. Therefore, the separate body motor is necessary and primary to the present invention.

In a conventional electromotor, its rotor and stator have strict mechanical relationship and are assembled in a shell precisely, and a gap between the rotor and the stator maintains at a constant value, the rotor can only rotate inside the stator and has no other degree of freedom. However, the separate body motor is different, the rotor and the stator are two independent element, and have no mechanical relationship but only interaction force of electromagnetic field.

(1) Rotor of the Separate Body Motor

Referring to FIG. 1, the rotor of the separate body motor has a basic structure consisting of a bar-shaped electromagnet and the rotating shaft. The rotating shaft passes through an end (S pole) of a magnet, and is connected by a key. An electromagnetic field of the stator and an electromagnetic field of the bar-shaped electromagnet interact to rotate the rotating shaft in a manner of torque.

(2) Stator of the Separate Body Motor

The stator of the conventional motor is several permanent magnets or electromagnets fixed inside the shell, and the rotor rotates inside the magnets. The rotor of the separate body motor does not have certain form, but needs only construct magnetic path. The stator of the separate body motor acts as a "magnetic path" of the dynamic magnetic suspension propeller. The stator can be substantially classified into two species of the rail type and the plane magnetic path type. The "magnetic path" can be each of electromagnets or permanent magnets.

Figure 2:
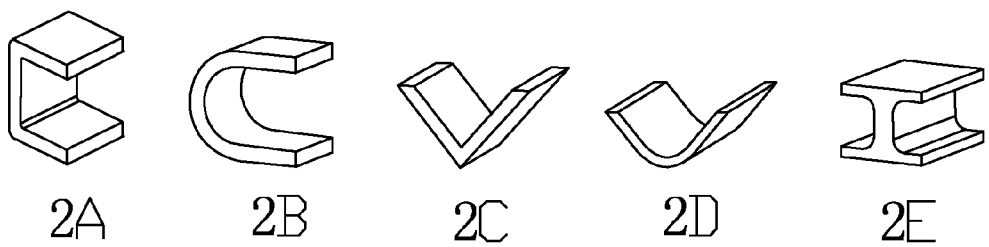
Figure 3:
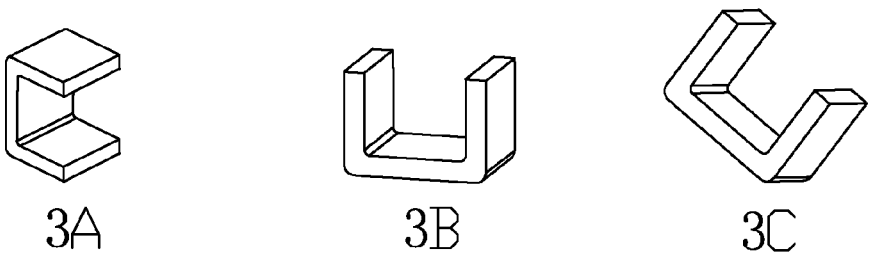
Figure 4:
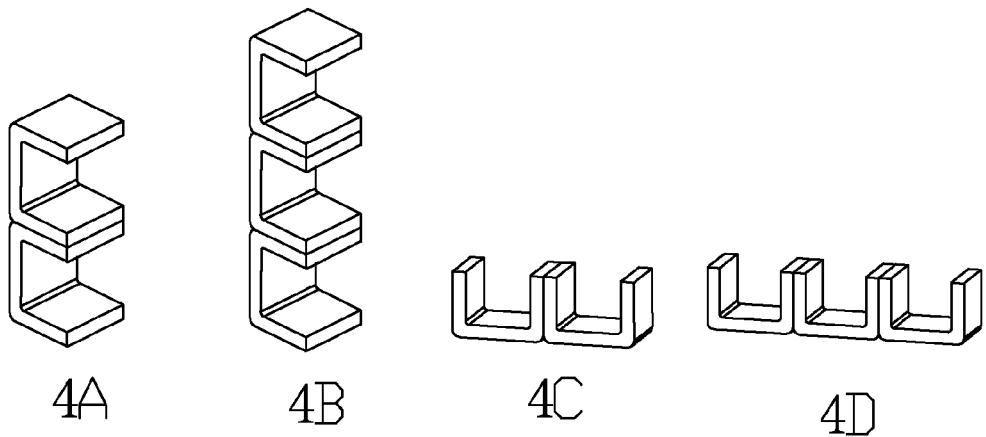

The rotor of the rail type can be rails of sections of different shapes, as illustrated in FIG. 2: groove shaped rail (FIG. 2A), U shaped rail (FIG. 2B), V shaped rail (FIG. 2C), parabola shaped rail (FIG. 2D), H-shaped rail (FIG. 2E), and so on. The arrangement of the rails can be various, as referring to the groove shaped rail, in FIG. 3A, the groove opening is horizontal, in FIG. 3B, the groove opening is upward, in FIG. 3C, the groove opening forms an inclined angle. In addition, two or more rails can be aligned to use to enhance intensity of magnetic induction. For example, FIG. 4A illustrates a layer by layer double lines groove shaped rail, FIG. 4B illustrates a layer by layer three lines groove shaped rail, FIG. 4C illustrates an aligned double lines groove shaped rail, FIG. 4D illustrates an aligned three lines groove shaped rail.

The rotor of the plane magnetic path type has a surface of a plane board. One kind is an integrated plant magnetic path, as illustrated in FIG. 5A, a plane having even magnetic field. Another kind is magnetic rail plane magnetic path, as illustrated in FIG. 5B, there is no rails, only the shadow part in the drawings has magnetism, and the magnetic suspension train runs along the magnetic rail.

B. External Force

In principle, any power capable of rotating the rotor of the separate body motor can be utilized as the external force. The most preferred embodiment of the external force is an electromotor. Both AC electromotor and DC electromotor is applicable, since the electromotor has high efficiency, reliable performance and low price.

An electromagnetic disk can be directly sleeved onto a main shaft of the electromotor, as illustrated in FIG. 25A. If prolonging the main shaft of the electromotor to make the main shaft extending from both front and rear sides of the electromotor, and each end thereof is mounted with an electromagnetic disk, a countertorque applied on the main shaft of the electromotor is enhanced doubly. The electromotor can be connected to the rotor of the separate body motor via a gearing and a transmission case.

C. Working Principle

A conventional motor, no matter AC electromotor or DC electromotor, the rotor thereof rotates in the manner of force couple, while the rotor of the separate body motor rotates in the manner of torque. Placing the rotor of the separate body motor onto the magnetic path, for convenientness, a groove shaped magnet is adopted to be the stator of the separate body motor herein, as illustrated in FIG. 6. The N pole of the magnet is underneath, and the S pole thereof is above.

Figure 7:
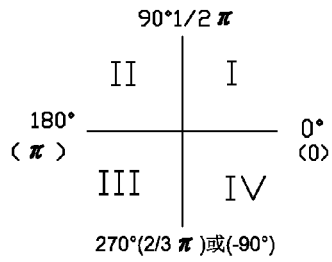

In mathematics, a plane is divided in to four quadrants, as illustrated in FIG. 7:

quadrant I, 0°~90° (or 0~1/2π)

quadrant II, 90°~180° (or 1/2~π)

quadrant III, 180°~270° (or π~3/2π)

quadrant IV, 270°~0° (or 3/2π~0)

Figure 8:
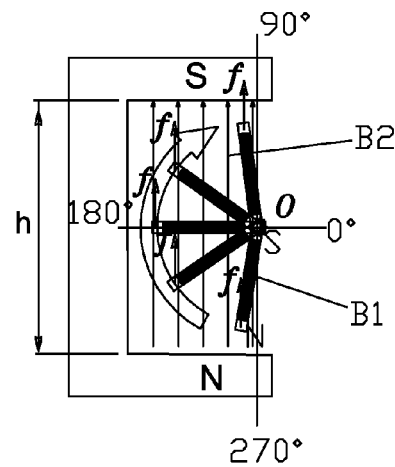

When current passes through the force arm, the force of magnetic induction of the separate body motor in the groove shaped magnet clockwise rotates the force arm from 270° to 90° around the 0 point, as illustrated in FIG. 8.

Provided that intensity of magnetic induction in any position within the stator is equal, the force of magnetic induction applying to the force arm when rotating is a constant value f.

Figure 9:
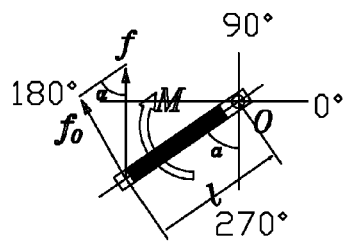

When the force arm rotates clockwise for an angle α, the torque M produced by f to the 0 point is equal to a perpendicular component of force $f_0$ multiplying by the length of the force arm 1, as illustrated in FIG. 9:

$$M = -f_0 * 1, \text{ i.e., } M = -f * 1 \sin \alpha$$

wherein "−" in the formula means a direction of the M is clockwise.

Figure 10:
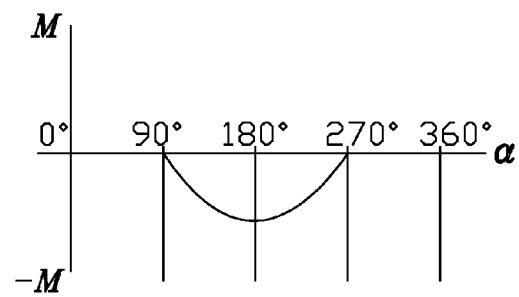

When the force arm is at 270° or 90°, sin α=0, i.e., M=0.
When the force arm is at 180°, sin α=1, i.e., M=f*1.
Therefore, when the force arm rotates from 270° to 90° around the 0 point, a magnitude of the torque M is presented as Sin α, as illustrated in FIG. 10. Because the torque is only produced in quadrant II and quadrant III, a curve of M is under the coordinate.

Figure 11:
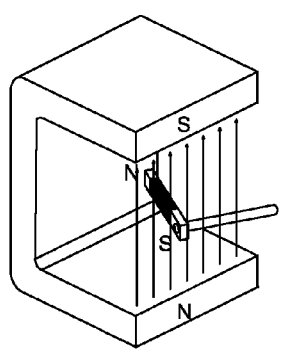

Turning the rotating shaft of the rotor by an angle in the horizontal, the force application of the force arm of the rotor is not affected, as illustrated in FIG. 11.

Figure 12:
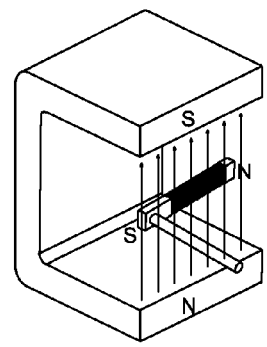

Even turning the rotating shaft of the rotor by 90° in the horizontal, the force application of the force arm of the rotor is not affected, either, as illustrated in FIG. 12.

Figure 13:
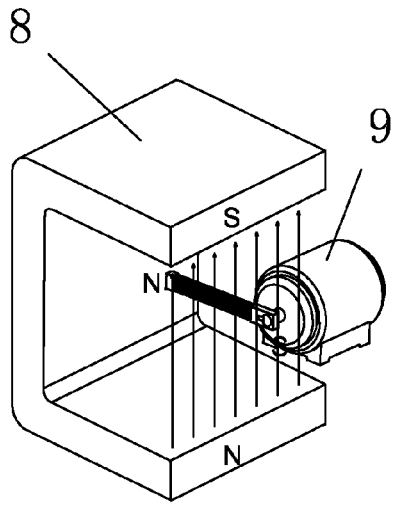

The force arm of the rotor of the separate body motor is mounted on a main shaft of a conventional motor $m_0$, as illustrated in FIG. 13.

When the conventional motor $m_0$ rotates the force arm counterclockwise from 90° to 270°, a countertorque $M_0$ is produced on the rotating shaft of the conventional motor $m_0$, $M_0$ has a magnitude equal to the torque M and an opposite direction.

$$M_0 = -M$$
$$= f * 1 \sin \alpha$$

i.e., $M_0$ is counterclockwise.

Figure 14:
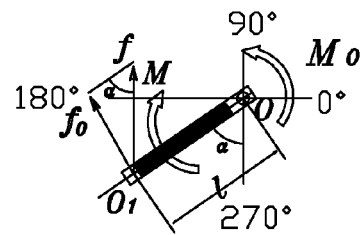

Actually, $M_0$ is the countertorque which has an instantaneous fulcrum on an end O1 of the magnet when the rotating shaft of the conventional motor $m_0$ rotates counterclockwise, as illustrated in FIG. 14.

Figure 15:
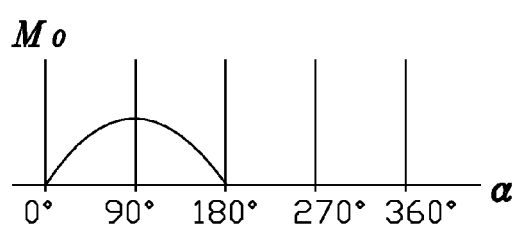

Regarding to the torque M, the countertorque $M_0$ is advanced for 90°. The countertorque $M_0$ is a sinusoid presented in quadrant I and quadrant II, as illustrated in FIG. 15.

Figure 16:
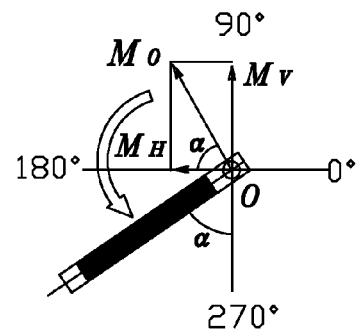

As the torque, the direction and magnitude of the countertorque $M_0$ is changed along with the position (i.e., the angle α) of the force arm (i.e., the electromagnet). The countertorque $M_0$ in any position can be divided into a horizontal subtorque $M_H$ and a perpendicular subtorque $M_v$, as illustrated in FIG. 16.

horizontal subtorque $M_H = M_0 \cos \alpha$ perpendicular subtorque $M_v = M_0 \sin \alpha$ because $M_0 = f * 1 \sin \alpha$ $M_H = f * 1 \sin \alpha \cos \alpha$ $M_V = f * 1 \sin^2 \alpha$ Based on the above formulas:

when α=0°, $M_H$=0; $M_V$=0 when α=45°, $M_H$=1/2$M_0$; $M_V$=1/2$M_0$ when α=90°, $M_H$=0; $M_V$=0 when α=135°, $M_H$=−1/2$M_0$; $M_V$=1/2$M_0$ when α=180°, $M_H$=0; $M_V$=0

Figure 17:
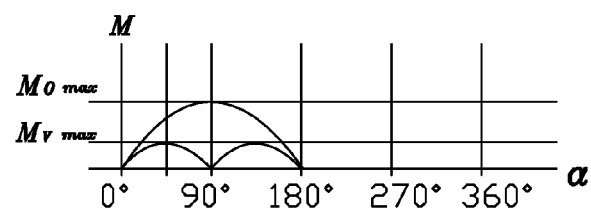

Therefore, when the conventional motor $m_0$ counterclockwise rotates the force arm from 90° to 270°, a curve of the perpendicular subtorque $M_V$ is presented as double sinusoid of the angle α on the coordinate, as illustrated in FIG. 17. A peak value $M_V$max of $M_V$ is produced each time the force arm rotates for 45°. The direction of the perpendicular subtorque $M_V$ is always upward. The horizontal subtorque $M_V$ has a half leftward and another half rightward which have equal value but opposite direction and balance out. The resultant moment of the perpendicular subtorque $M_V$ is the suspension force of the dynamic magnetic suspension propeller.

When the main shaft of the conventional motor $m_0$ rotates, the mechanical work $P_v$ by the perpendicular subtorque $M_V$ is as follows:

$$PV = \int f 1 \sin^2 \alpha \, d\alpha$$

Because the main shaft of the conventional motor $m_0$ produces the countertorque only in quadrant II and quadrant III, as illustrated in FIG. 7, the definite integral formula should be:

$$PV = \int_{-1/2\pi}^{1/2\pi} fl \sin^2 \alpha \, d\alpha$$
$$= 1/2 fl$$

Provided that a rotating speed of the conventional motor $m_0$ is n per minute, the output power of the conventional motor $m_0$ in the perpendicular subtorque is:

$$Nv = \frac{1}{2} \times \frac{n}{60} fl$$
$$= \frac{n}{120} fl \text{ or } Nv = \frac{1}{75} \times \frac{n}{120} fl \text{(horsepower Hp)}$$

wherein f is the force of magnetic induction between the rotor and the stator of the separate body motor, and a unit thereof is Kg, l is the length of the electromagnet of the rotor of the separate body motor, and a unit thereof is meter, n is the rotating speed of the conventional motor $m_0$, and a unit thereof is round/minute.

Figure 18:
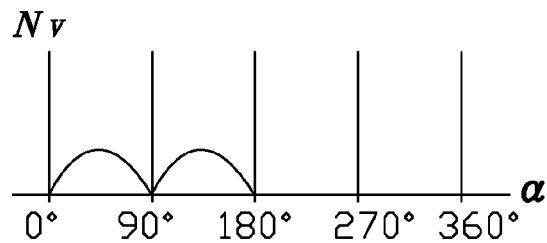

The foregoing refers to the situation that the main shaft of the conventional motor $m_0$ is only assembled with a cantilever electromagnet. When the main shaft of the conventional motor $m_0$ rotates for a round, Nv produces two incontinuous shakes, as illustrated in FIG. 18.

Figure 19:
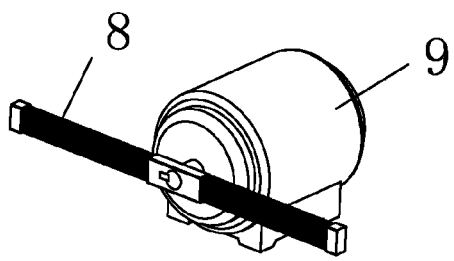
Figure 20:
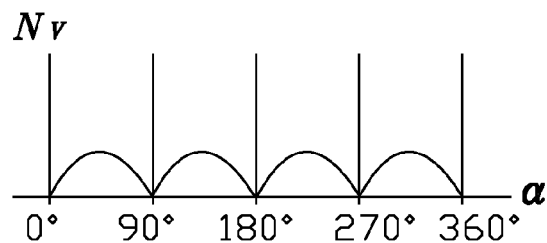

Two electromagnets are symmetrically assembled on the main shaft of the conventional motor $m_0$, as illustrated in FIG. 19. Nv produces continuous shakes on the main shaft, as illustrated in FIG. 20.

Figure 21:
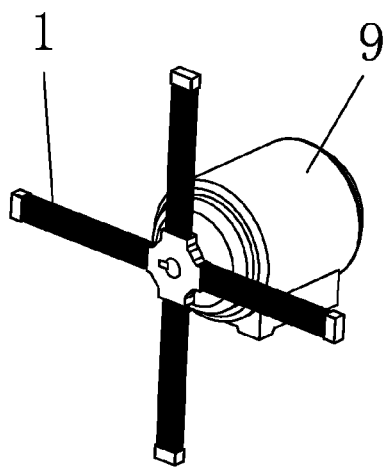

The electromagnets assembled on the main shaft of the conventional motor $m_0$ are increased to four, as illustrated in FIG. 21. A shaking frequency of the output power Nv in the perpendicular subtorque on the main shaft is increased, and the swing is decreased correspondingly, and the resultant Nv is increased by times in value, as illustrated in FIG. 22.

The electromagnets assembled on the main shaft of the conventional motor $m_0$ are increased to eight, as illustrated in FIG. 23. A shaking frequency of the output power Nv in the perpendicular subtorque on the main shaft is further increased, and the swing is further decreased correspondingly, and the resultant Nv is further increased by times in value, as illustrated in FIG. 24.

The element assembled with eight electromagnetic magnets is called an electromagnetic disk.

Several electromagnetic disks are staggeredly assembled on the main shaft of the conventional motor $m_0$, as illustrated in FIG. 25A, nine electromagnetic disks are assembled. The output power Nv of the conventional motor $m_0$ in the perpendicular subtorque is greatly enhanced. The power curve of Nv is approximately a straight line, as illustrated in FIG. 25B.

As described above, for each electromagnet, the output power of the conventional motor $m_0$ in the perpendicular subtorque is:

$$Nv = \frac{1}{75} \times \frac{n}{120} fl \text{(horsepower Hp)}$$

Provided that each electromagnetic disk has $k_1$ electromagnets, and $k_2$ electromagnetic disks are assembled on the main shaft of the conventional motor $m_0$, the output power of the conventional motor $m_0$ in the perpendicular subtorque is:

$$Nv = k_1 * k_2 * \frac{1}{75} \times \frac{n}{120} fl \text{(horsepower Hp)}$$

The conventional motor $m_0$ and several electromagnetic disks construct the dynamic magnetic suspension propeller, called propeller for short.

II. Application of the Dynamic Magnetic Suspension Propeller

According to the main function, the dynamic magnetic suspension propeller is classified into a suspension force propeller for suspending the magnetic suspension train and a motion propeller for moving the magnetic suspension train.

According to arrangement, the main shaft of the suspension force propeller can be classified into a transverse shaft type and a axialshaft type.

The magnetic path of the rotor can be classified into a rail type and a plane magnetic path type.

A. Rail Type

1. Transverse Shaft Type

Figure 26:
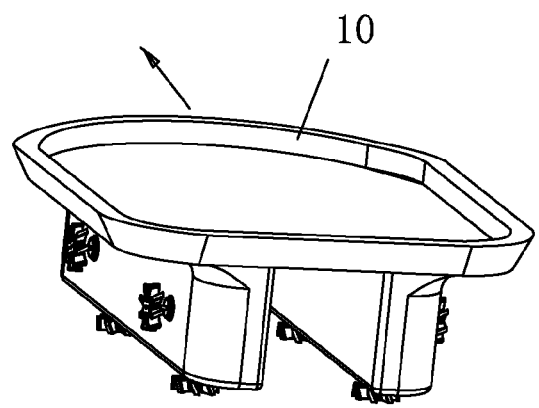

The transverse shaft type is that the shaft of the suspension force propeller is perpendicular to a moving direction of the magnetic suspension train, as illustrated in FIG. 26, the arrow indicates the moving direction of the magnetic suspension train, and the suspension force propeller is mounted aside.

Figure 27:
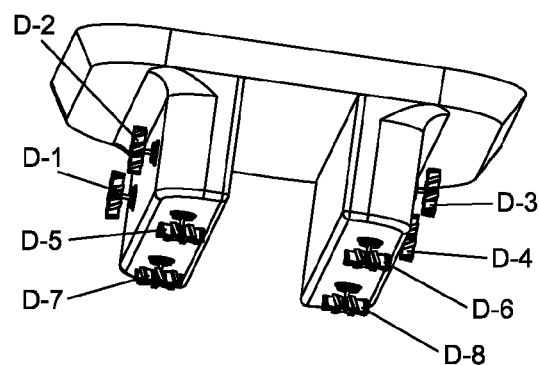

Four suspension force propellers D-1, D-2, D-3, D-4 are mounted on left and right sides of the magnetic suspension train. And four motion propellers D-5, D-6, D-7, D-8 are mounted under the magnetic suspension train, as illustrated in FIG. 27.

Figure 28:
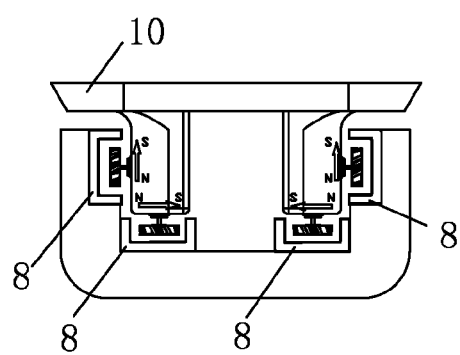

The rails of the magnetic suspension train is composite, as illustrated in FIG. 28, the groove openings on left and right sides are arranged horizontally, and the two groove openings underneath are upward. A direction of magnetic force lines of the groove openings are indicated by the arrow in the drawing.

Working Principle:

(1) Suspension Force

Figures 29, 30, 31:
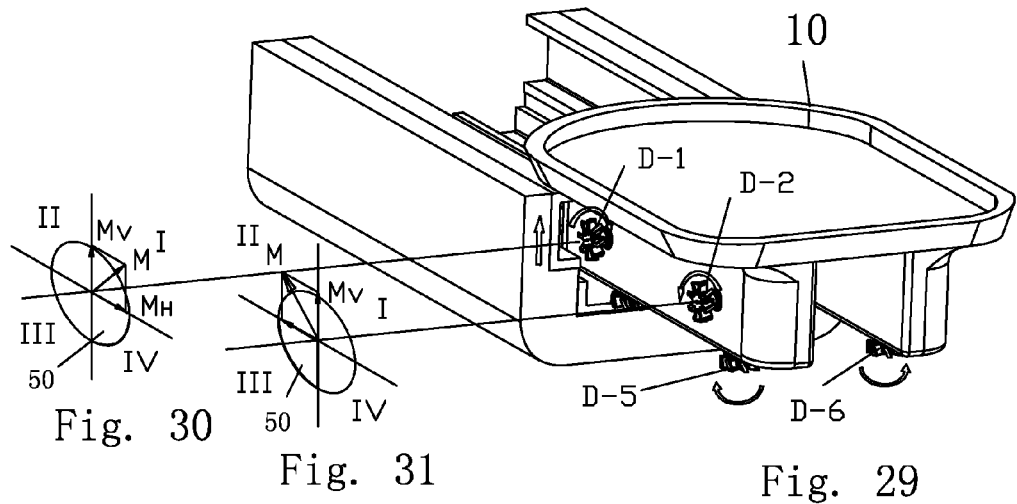

Regarding to the suspension force propellers D-1 and D-2 on the left side of the magnetic suspension train, the D-1 rotates clockwise while the D-2 rotates counterclockwise, as illustrated in FIG. 29.

An electrified range of the D-1 is in quadrant IV, and the countertorque M is produced in quadrant I. The perpendicular subtorque $M_v$ of the countertorque M is upward, and the horizontal subtorque $M_H$ is rightward, as illustrated in FIG. 30.

An electrified range of the D-2 is in quadrant III, and the countertorque M is produced in quadrant II. The perpendicular subtorque $M_v$ of the countertorque M is upward, and the horizontal subtorque $M_H$ is leftward, as illustrated in FIG. 31.

The perpendicular subtorque $M_v$ of the D-1 and D-2 construct the suspension force of the magnetic suspension train, and the horizontal subtorque $M_H$ balance out.

The force application on the D-3 and D-4 is the same, and also constructs the suspension force.

(2) Propelling Force

Figures 32, 33, 34:
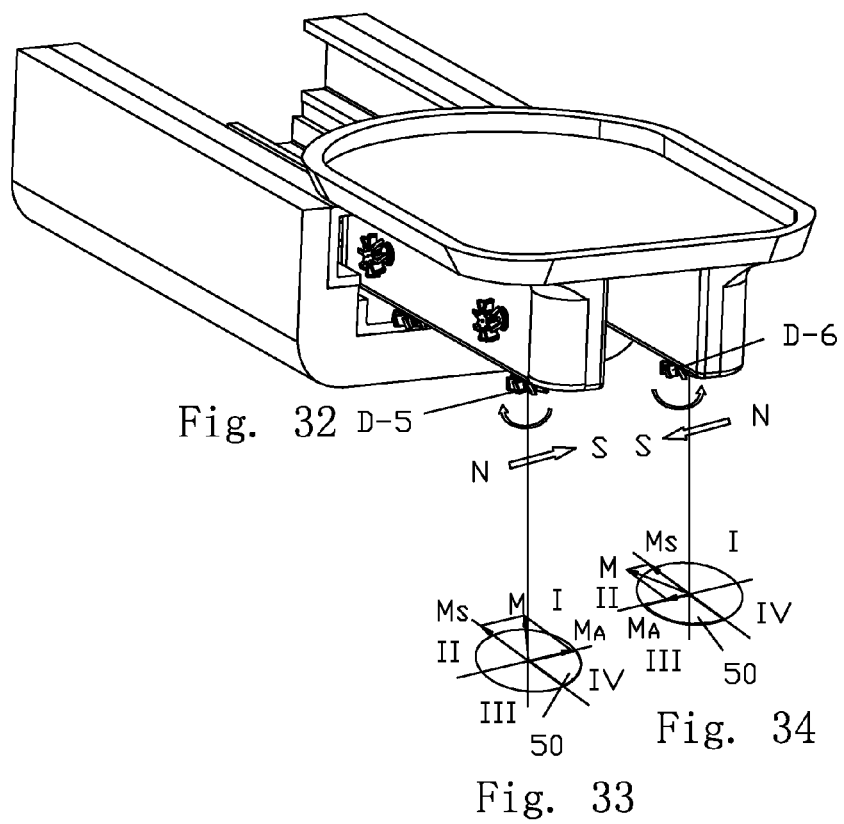

Regarding to the motion propellers D-5 and D-6 on the rear and bottom side of the magnetic suspension train, the D-5 rotates clockwise while the D-6 rotates counterclockwise, as illustrated in FIG. 32.

An electrified range of the D-5 is in quadrant IV, and the countertorque M is produced in quadrant I. The axial subtorque $M_s$ of the countertorque M is forward, and the transverse subtorque $M_A$ is rightward, as illustrated in FIG. 33.

An electrified range of the D-6 is in quadrant III, and the countertorque M is produced in quadrant II. The axial subtorque $M_s$ of the countertorque M is forward, and the transverse subtorque $M_A$ is leftward, as illustrated in FIG. 34.

The axial subtorque $M_s$ of the D-5 and D-6 construct the propelling force of the magnetic suspension train, and the transverse subtorque $M_A$ balance out when the leftward and the rightward is equal. When the transverse subtorque $M_A$ of the leftward and the rightward is not equal, e.g., the transverse force of the D-6 is larger than the transverse force of the D-5, the magnetic suspension train will align leftwardly, which causes that a gap between the D-5 and the N pole of the rail reduces, and therefore the force of magnetic induction increases, and the countertorque M increases. On the other hand, a gap between the D-6 and the N pole of the rail increases, and therefore the force of magnetic induction applied on the D-6 decreases, and the countertorque M decreases therewith. Increasing of the countertorque M of the D-5 and decreasing of the countertorque M of the D-6 urges the magnetic suspension train move back rightwardly till balance.

The autobalance character of the dynamic magnetic suspension propeller proves obvious advantage as comparing to static magnetic suspension propeller of magnetic force.

The force application on the D-7 and D-8 is the same, and also constructs the propelling force.

2. Axialshaft Type

Figure 35:
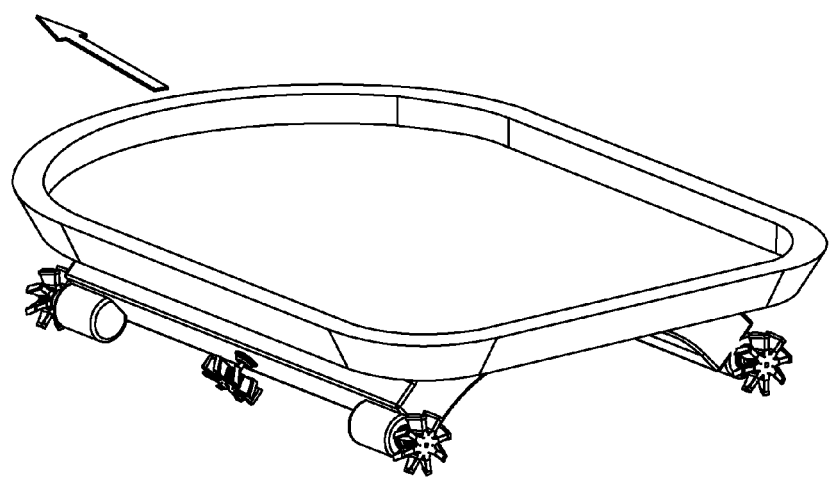

The axialshaft type is that the shaft of the suspension force propeller is consistent with the moving direction of the magnetic suspension train, as illustrated in FIG. 35.

Figure 36:
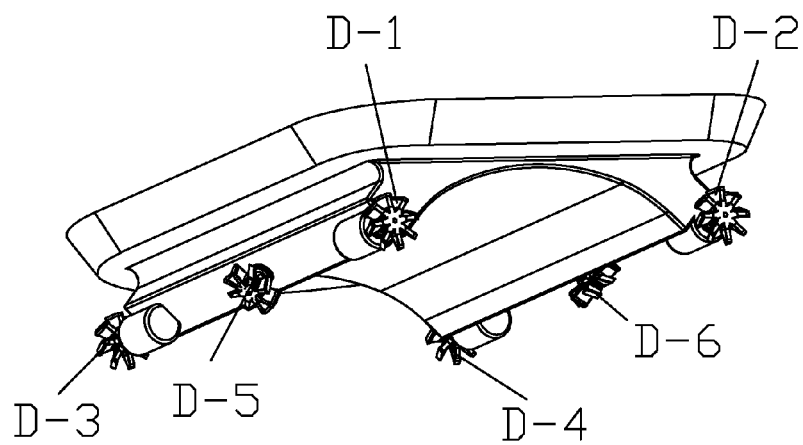

Four suspension force propellers D-1, D-2, D-3, D-4 are mounted on front and rear sides of the magnetic suspension train. And two motion propellers D-5, D-6 are mounted under the magnetic suspension train, as illustrated in FIG. 36.

Figure 37:
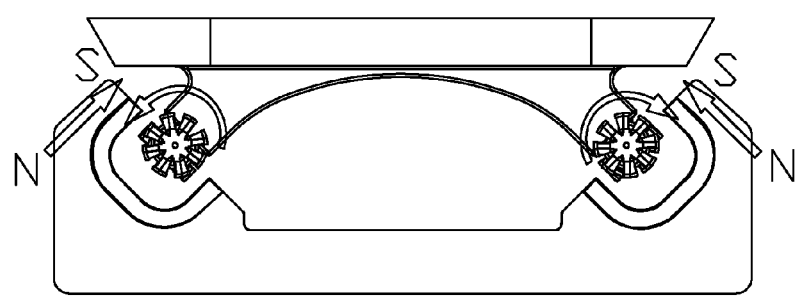

The rails of the magnetic suspension train have inclined groove openings, as illustrated in FIG. 37. A direction of magnetic force lines of the groove openings are indicated by the arrow in the drawing.

Working Principle:

(1) Suspension Force

Regarding to the suspension force propellers D-1 and D-2 on the rear side of the magnetic suspension train, the D-1 rotates counterclockwise while the D-2 rotates clockwise, as illustrated in FIG. 38.

An electrified range of the D-1 is in quadrant III, and the countertorque M is produced in quadrant II. The perpendicular subtorque $M_v$ of the countertorque M is upward, and the horizontal subtorque $M_H$ is leftward, as illustrated in FIG. 39.

An electrified range of the D-2 is in quadrant IV, and the countertorque M is produced in quadrant I. The perpendicular subtorque $M_v$ of the countertorque M is upward, and the horizontal subtorque $M_H$ is rightward, as illustrated in FIG. 40.

The perpendicular subtorque $M_v$ of the D-1 and D-2 construct the suspension force of the magnetic suspension train, and the horizontal subtorque $M_H$ balance out. When the horizontal subtorque $M_H$ of the leftward and the rightward is not equal, the propeller has the autobalance character.

The force application on the D-3 and D-4 is the same, and also constructs the suspension force.

(2) Propelling Force

Regarding to the motion propellers D-5 and D-6 under the magnetic suspension train, the D-5 rotates clockwise while the D-6 rotates counterclockwise, as illustrated in FIG. 41.

An electrified range of the D-5 is in quadrant II, and the countertorque M is produced in quadrant I. The axial subtorque $M_s$ of the countertorque M is forward, and the perpendicular subtorque $M_v$ is upward, as illustrated in FIG. 42.

An electrified range of the D-6 is in quadrant IV, and the countertorque M is produced in quadrant I. The axial subtorque $M_s$ of the countertorque M is forward, and the perpendicular subtorque $M_v$ is upward, as illustrated in FIG. 43.

The axial subtorque $M_s$ of the D-5 and D-6 construct the propelling force of the magnetic suspension train, and the perpendicular subtorque $M_v$ constructs an assistant suspension force of the magnetic suspension train.

B. Plane Magnetic Path Type

1. Structure of the Magnetic Suspension Train

Four suspension force propellers D-1, D-2, D-3, D-4 are mounted on front and rear sides of the magnetic suspension train. Four motion propellers D-5, D-6, D-7, D-8 are mounted on left and right sides of the magnetic suspension train. And four landing wheel W1, W2, W3 and W4 are mounted on the belly of the magnetic suspension train for supporting when idle, as illustrated in FIG. 44.

Working Principle:

(1) Suspension Force

Regarding to the suspension force propellers D-1 and D-2 on the rear side of the magnetic suspension train, the D-1 rotates counterclockwise while the D-2 rotates clockwise, as illustrated in FIG. 45.

An electrified range of the D-1 is in quadrant III, and the countertorque M is produced in quadrant II. The perpendicular subtorque $M_v$ of the countertorque M is upward, and the horizontal subtorque $M_H$ is leftward, as illustrated in FIG. 46.

An electrified range of the D-2 is in quadrant IV, and the countertorque M is produced in quadrant I. The perpendicular subtorque $M_v$ of the countertorque M is upward, and the horizontal subtorque $M_H$ is rightward, as illustrated in FIG. 47.

The perpendicular subtorque $M_v$ of the D-1 and D-2 construct the suspension force of the magnetic suspension train, and the horizontal subtorque $M_H$ balance out.

The force application on the D-3 and D-4 is the same, and also constructs the suspension force.

By controlling and adjusting current intensity on the magnetic disks of the suspension force propellers, the horizontal subtorque of each propellers are controlled, so as to suspend the magnetic suspension train on a predetermined position.

(2) Propelling Force

① Moving Forwardly

Regarding to the motion propellers D-5 and D-6 on the left side of the magnetic suspension train, both of the D-5 and the D-6 rotates counterclockwise, as illustrated in FIG. 48.

An electrified range of the D-5 and D-6 is in quadrant III, and the countertorque M is produced in quadrant II. The perpendicular subtorque $M_v$ of the countertorque M is upward, and the horizontal subtorque $M_s$ is forward, as illustrated in FIG. 49.

The perpendicular subtorque $M_s$ of the D-5 and D-6 constructs an assistant suspension force of the magnetic suspension train, and the horizontal subtorque $M_s$ is combined to be the forward propelling force.

The force application on the D-7 and D-8 is the same, and also constructs the propelling force.

Figure 50:
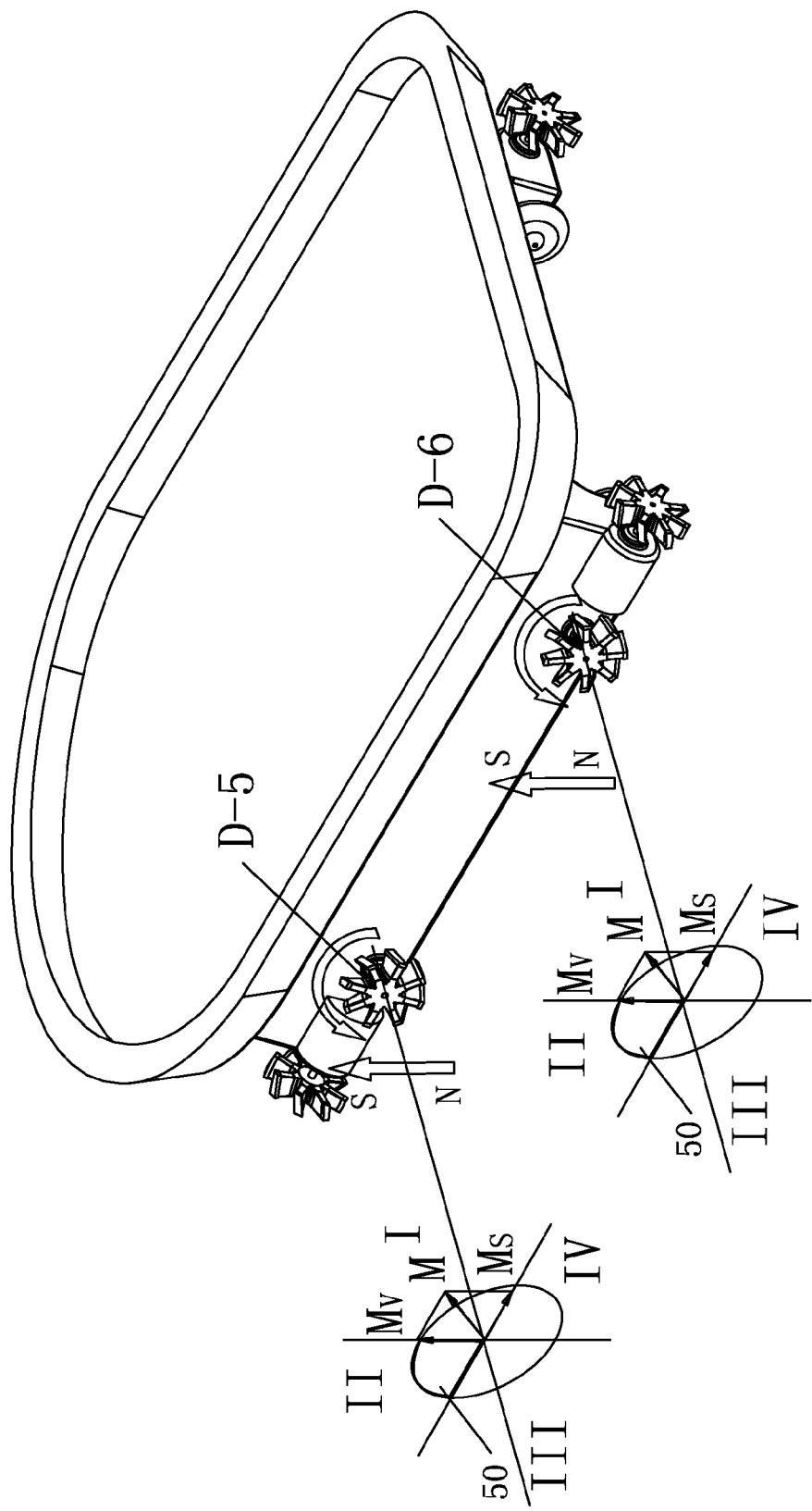
Figure 51:
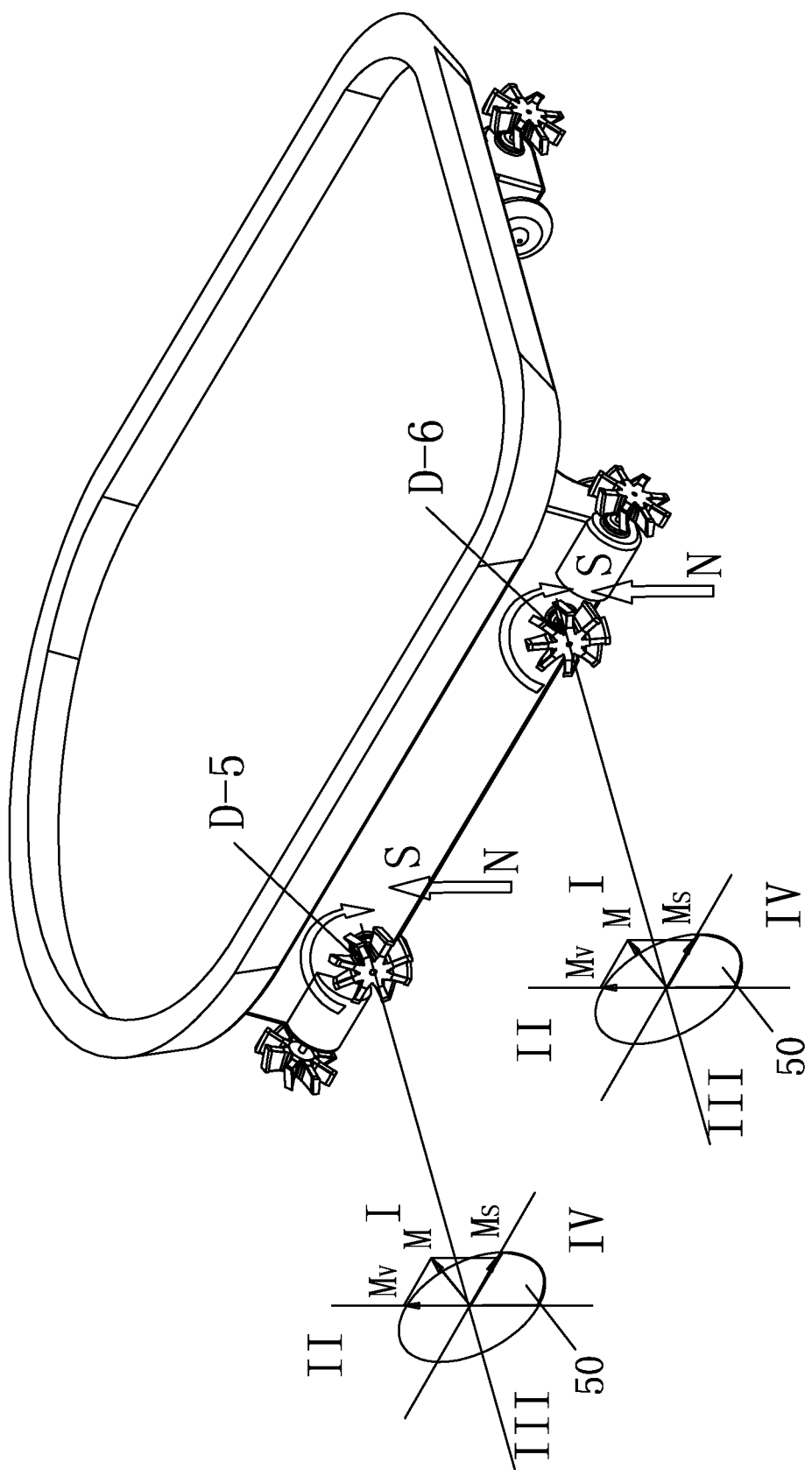
Figure 52:
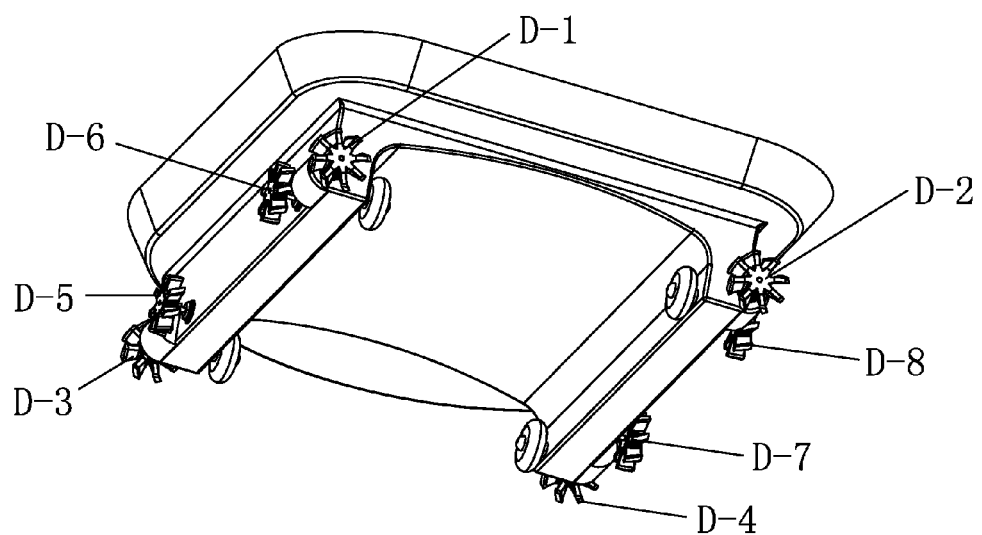

② Moving Rearwardly a. Moving rearwardly slowly: four motion propellers keep rotating counterclockwise, and the electrified range is changed to quadrant II. Because the electrified range of the electromagnetic disks on the propellers increases, the countertorque M decreases, the magnetic suspension train moves rearwardly slowly, as illustrated in FIG. 50.

b. Moving rearwardly fast: four motion propellers are changed to rotate clockwise, and the electrified range is changed to quadrant IV, the magnetic suspension train will move rearwardly fast, as illustrated in FIG. 51.

(3) Turing

By changing any technical parameter, such as rotating speed, rotating direction, electrified range, and electrified current, of the motion propellers D-5, D-6, D-7, D-8 on the magnetic suspension train, the countertorque of the propellers will be changed, so as to change a motion state of the magnetic suspension train. For example, reducing the countertorque of the D-5, the magnetic suspension train will turn left. And if reducing the countertorque of the D-8 at the same time, the magnetic suspension train will turn left suddenly.

(4) Moving Sidewardly

By changing any technical parameter, such as rotating speed, rotating direction, electrified range, and electrified current, of the suspension force propellers D-1, D-2, D-3, D-4 on the same side of the magnetic suspension train, the magnetic suspension train will move sidewardly. For example, reducing the countertorque of the D-1 and D-3, the magnetic suspension train will move leftwardly, and if reducing the opposite side, the magnetic suspension train will move rightwardly.

3. Forms of the Plane Magnetic Path

The electromagnetic field of the plane magnetic path can be permanent magnet or electromagnet. According to distribution of the electromagnetic field on the plane magnetic path, the plane magnetic path can be classified into an integrated board plane magnetic path and a magnetic rail plane magnetic path.

Figure 53:
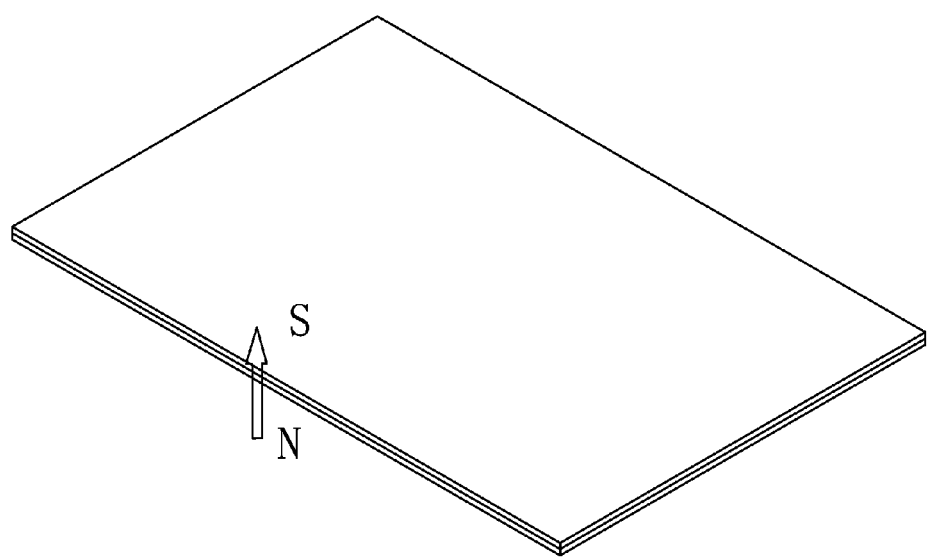

(1) integrated board plane magnetic path: a plane magnetic path formed by an integrated board having even magnetic field, as illustrated in FIG. 53. The magnetic suspension train can rotate on the plane magnetic path toward any direction or rotate at the original position, which is very flexible.

Figure 54:
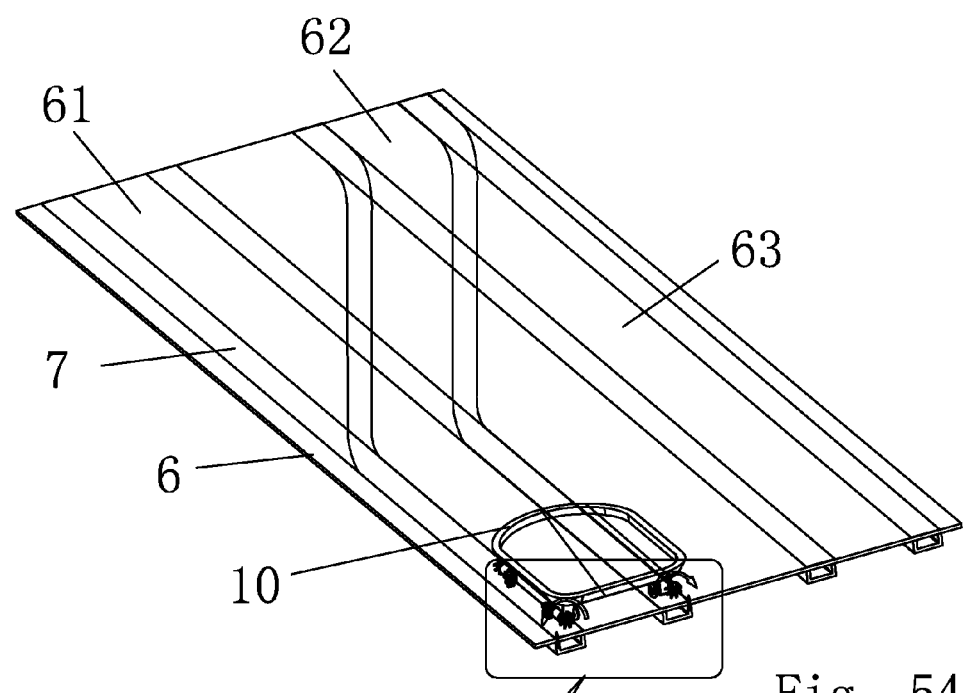
Figure 55:
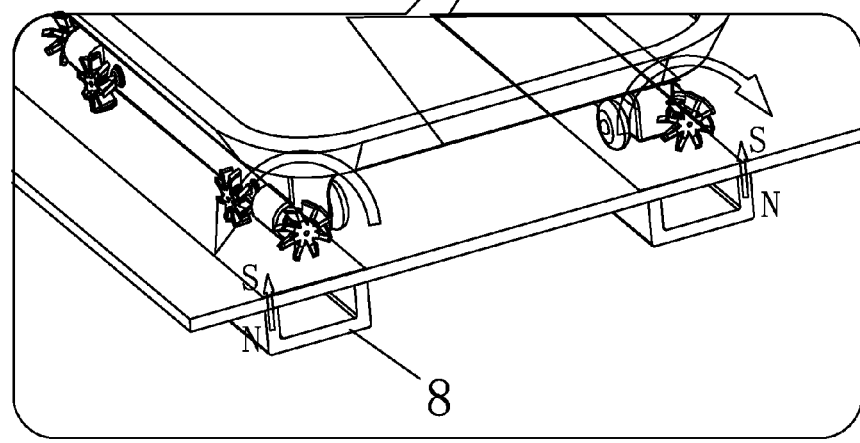

(2) magnetic rail plane magnetic path: the structure is like placing a plane board on rails of magnetism, and the magnetic force lines pass through the plane board to make the dynamic magnetic suspension propeller produce power. As illustrated in FIG. 54, the plane magnetic path is formed by the magnetic rails of double rails of double lines. The left two magnetic rails are slow line, and the right two magnetic rails are fast line. The magnetic suspension train can change line by a turnoff. The magnetic suspension train runs along the magnetic rails. As described above, the magnetic suspension train has the autobalance character under the magnetic field of the rails, and therefore is reliable and safe. FIG. 55 is a partial enlarged view of FIG. 54.

A. Magnetization of the magnetic path.

1. Permanent magnet type: the entire rails or the entire magnetic paths are made of permanent magnets.

2. Fixed electromagnetic induction magnetic path: fixed electromagnetic induction coil are mounted on the rail type magnetic path or plane magnetic path to magnetize the magnetic path.

Figure 56:
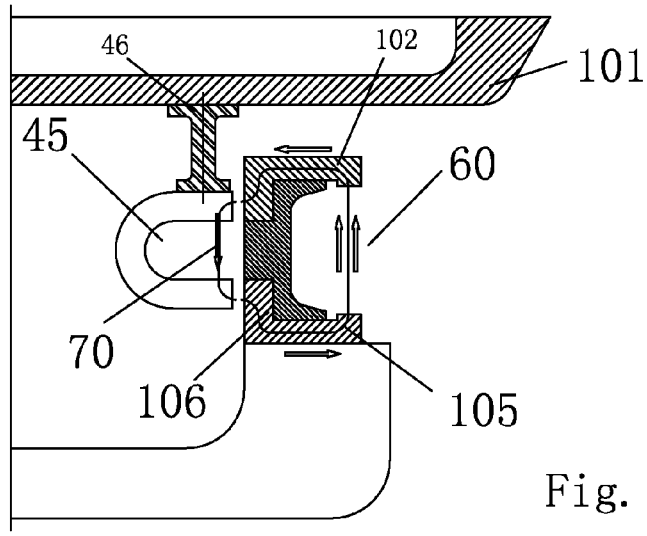
FIG. 56 is a sketch view of electromagnetic induction by synchronical moving of permanent magnet.
Figure 57:
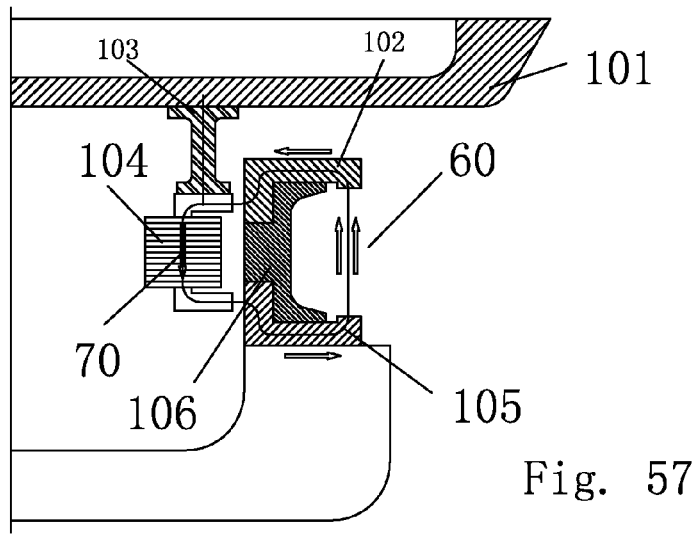
FIG. 57 is a sketch view of electromagnetic induction by synchronical moving of electromagnet.
Figure 58:
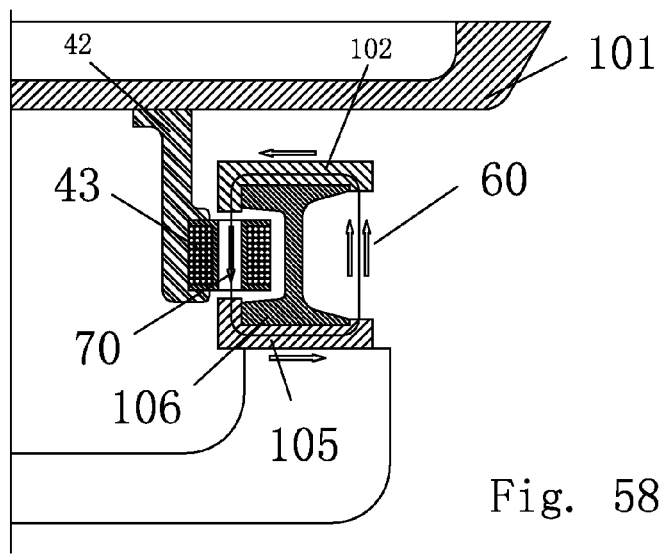
FIG. 58 is a sketch view of electromagnetic induction by synchronical moving of electromagnetic induction coil.

3. Electromagnetic induction by synchronical moving: the rails are magnetized by the permanent magnets or electromagnets or electromagnetic induction coils mounted on the magnetic suspension train. The magnetic force lines of the magnet pass through air gap to magnetize the rails to form the magnetic path, as illustrated in FIG. 56-58. Because the magnetic source producing the magnetic field moves along with the magnetic suspension train, wherever the magnetic suspension train arrives, the rails around are magnetized to be the magnetic path, and the rest remains non-magnetic. Regarding to a conventional magnetic suspension train, when running, a large section of the rails forward must be magnetized in advance, which wastes energy.

Advantages of the present invention comprise:

(1) mounting a controlling system of the rotor and the stator of the separate body motor on the magnetic suspension train, so as to control the running of the magnetic suspension train most efficiently;

(2) increasing application efficiency of electrical energy, eliminating the energy consuming caused by magnitizing the rail in advance;

(3) greatly simplifying the structure of the rails, reducing construction cost, and reducing maintenance fee;

(4) utilizing existing train rails to be the magnetic path, so as to save construction cost.

Electromagnetic induction by moving can be classified into: (1) indirect electromagnetic induction type The magnetic force lines are produced by the magnets (permanent magnets or electromagnets) mounted on the magnetic suspension train, enter a lower rail via the air gap, pass through a working area between the upper rail and the lower rail, and then return to the magnets to form an entire magnetic loop.

Figure 59:
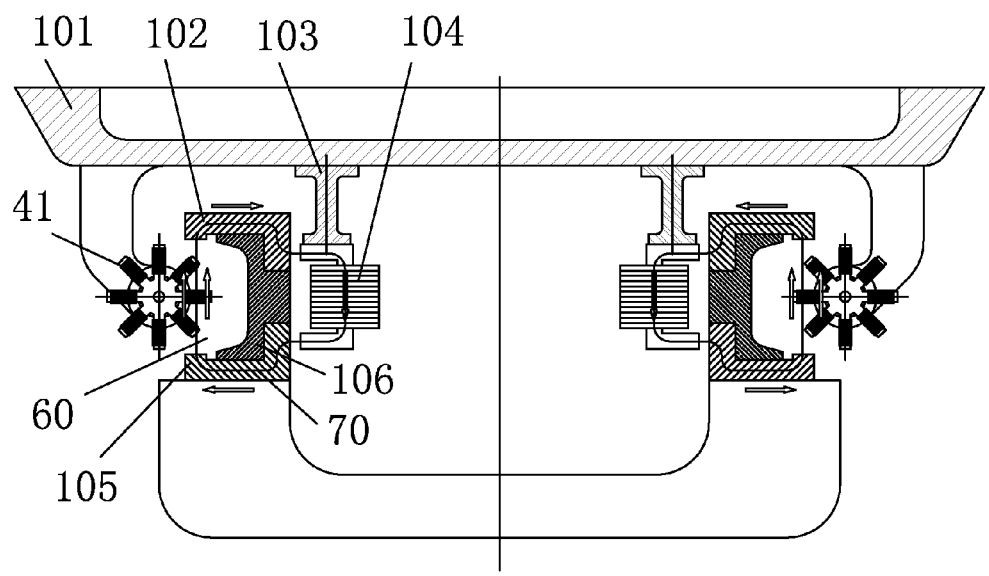
FIG. 59 is a sketch view of indirect electromagnetic induction type-electromagnet induction rail.

The upper rail and the lower rail are constructed by iron magnetic materials, and are connected by a frame therebetween which is made of non-iron magnetic materials. The rotor of the magnetic suspension train runs between the working area of the magnetic path, as illustrated in FIG. 59.

Figure 60:
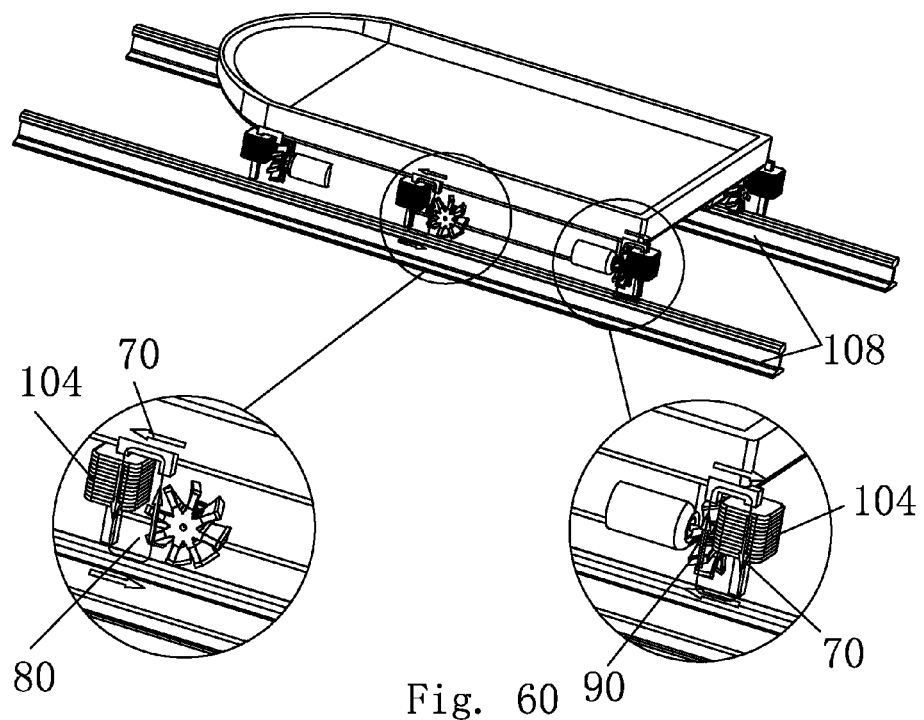
FIG. 60 is a sketch view of indirect electromagnetic induction type rail utilizing the train rails.

FIG. 60 illustrates utilizing the train rail as the magnetic path.

Figure 61:
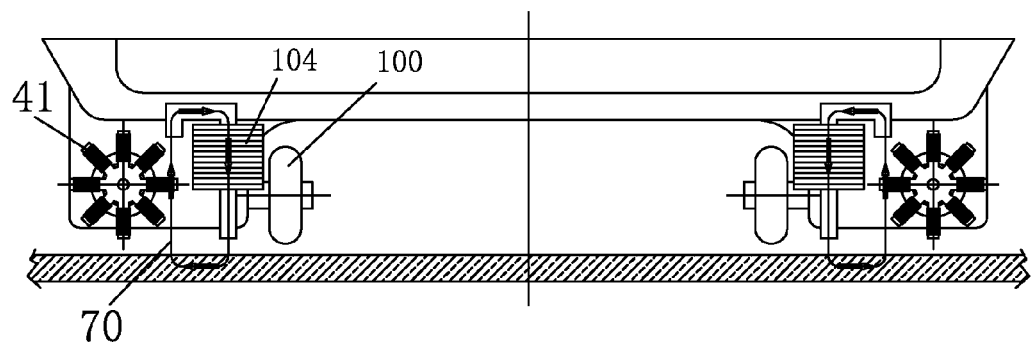
FIG. 61 is a sketch view of indirect electromagnetic induction type applied in plane magnetic path.

FIG. 61 is a sketch view of the indirect electromagnetic induction type applied in plane magnetic path.

(2) direct electromagnetic induction type

Figure 62:
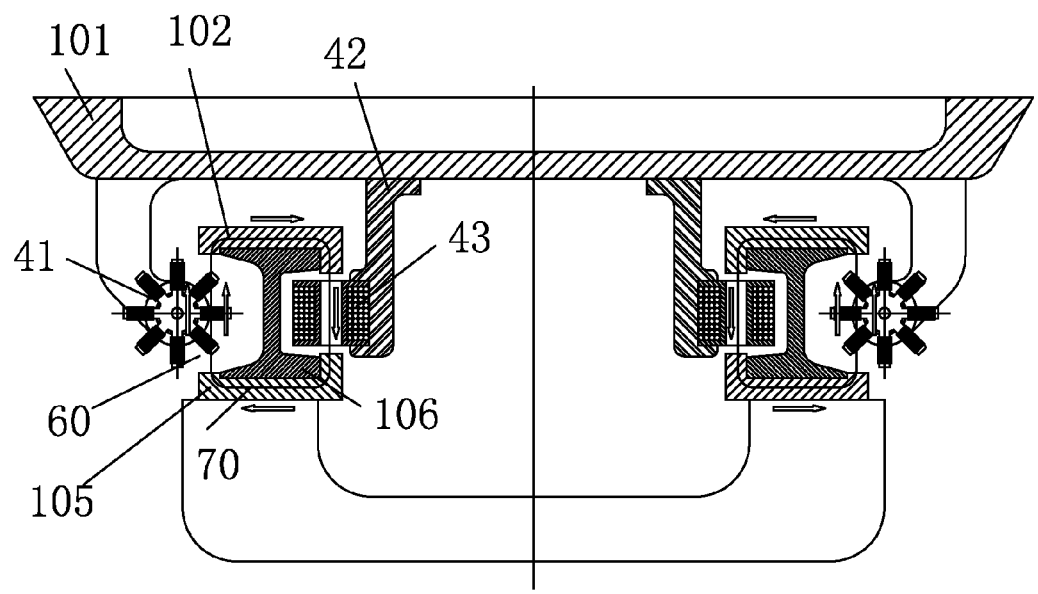
FIG. 62 is a sketch view of application of direct electromagnetic induction type-electromagnetic induction coil.

The electromagnetic induction coil is mounted on the magnetic suspension train, when current passes through the coil, the magnetic force lines enter a lower rail via the air gap, pass through a working area between the upper rail and the lower rail, and then return to the magnets to form an entire magnetic loop. The upper rail and the lower rail are constructed by iron magnetic materials, and are connected by a frame therebetween which is made of non-iron magnetic materials, as illustrated in FIG. 62.

B. Magnetization of the rotor 1. Electromagnetic disk: as described above, several cantilever electromagnets are evenly mounted on the rotating shaft to form a disk-shaped electromagnetic disk. The electrified range of the electromagnetic induction coil of each cantilever electromagnet is under control, so as to make the rotating shaft produce best countertorque at every moment.

2. Transfer of the magnetic force

The character is that: the magnets (permanent magnets or electromagnets) producing the magnetic field do not have direct mechanical relationship with the rotor, i.e., the magnets do not rotate with the rotor.

Figure 63:
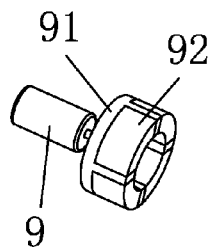
FIG. 63 is a sketch view of a rotating canister with embedded blocks.
Figure 64:
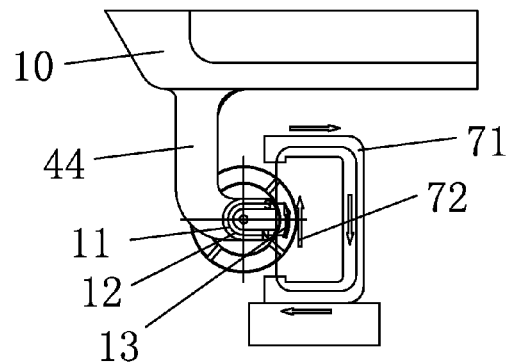
FIG. 64 is a sketch view of a rotor with magnetic force transferred.
Figure 65:
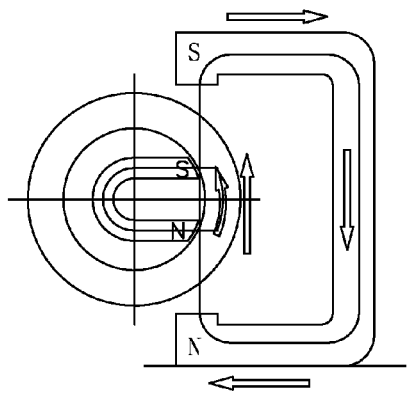
FIG. 65 is a sketch view of a limiting position of the fan-shaped embedded blocks in magnetic field when the rotor is still.
Figure 66:
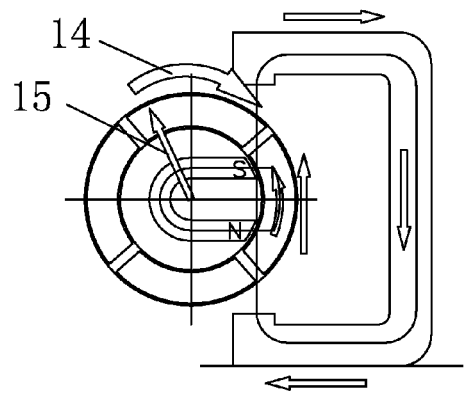
FIG. 66 is a sketch view of a countertorque produced on a rotating shaft when an external force rotates a the rotor counterclockwise.

The basic structure is that: the rotating canister is made of nonmagnetic materials, and is evenly embedded with several fan-shaped magnetic embedded blocks, taking 4 for example, as illustrated in FIG. 63. The magnets (permanent magnets or electromagnets) are mounted on a frame extending from the magnetic suspension train, as illustrated in FIG. 64. The magnetic force lines of the magnet enter the corresponding part of the rotor via the air gap from the N pole, and then return to the S pole of the magnet via the air gap to form an entire magnetic loop. Therefore, the parts magnetized act as the cantilever magnets with respect to the rotating shaft of the rotor. When the rotor is still, the magnetized fan-shaped embedded blocks on the rotating canister stay at the limiting position under action of the magnetic field of the stator, as illustrated in FIG. 65. If an external force rotates the rotor counterclockwise, a countertorque will be produced on the rotating shaft, as illustrated in FIG. 66, which has equal effect to the electromagnetic disk.

The rotating canister has the following structure:

(1) embedded blocks type: the rotating canister is made of non-iron magnetic materials, and is evenly embedded with several fan-shaped magnetic embedded blocks, as illustrated in FIG. 63.

Figure 67:
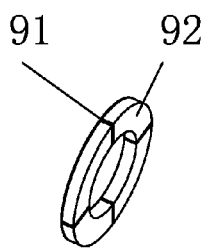
FIG. 67 is a sketch view of a disk with embedded pieces.
Figure 68:
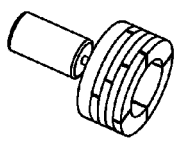
FIG. 68 is a sketch view of a rotating canister with embedded pieces.
Figure 69:
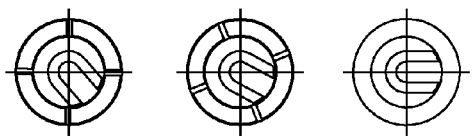

(2) embedded pieces type: several fan-shaped embedded pieces made of iron magnetic materials are evenly embedded on a round disk made of non-iron magnetic materials, as illustrated in FIG. 67. By piling up several round disks embedded with fan-shaped iron magnetic pieces staggeredly, a rotating canister of embedded blocks type is formed , as illustrated in FIG. 68.

The present invention has the following advantages:

(1) regarding to rotor utilizing electromagnet as magnetic source, the present invention avoids using electric brush, greatly simplifies the structure of the rotor and reduces a weight thereof;

(2) permanent magnet can be adopted to be the magnetic source of the rotor, to save electrical energy for magnetizing the rotor;

(3) the magnetization range between the rotor and the stator can be adjusted easily;

(4) production cost and maintenance fee is reduced.

Since German engineer Hermann Kemper raised the principle of magnetic suspension, the magnetic suspension technology is limited to utilizing the potential energy of the magnetic field to produce magnetic suspension force, i.e., the magnitude of the magnetic suspension force depends on the interaction force between the magnetic suspension train and the magnetic rail. The dynamic magnetic suspension propeller according to the present invention produces the suspension force by utilizing kinetic energy firstly, so as to transform the external force which was not related to the magnetic suspension force into magnetic suspension force by the separate body motor, so as to enhance the value of the magnetic suspension force.

The value of the magnetic suspension force of the dynamic magnetic suspension propeller can be expressed with the following formula:

$$\text{the value of the magnetic suspension force } F2 = K2 * n / 60 * L * B3 * B4$$

wherein, K2 is a constant related to mechanical characters and materials;

N is a rotating speed (round/minute) of the external force (motor) to reversely rotate the electromagnetic disk;

L is the length (meter) of the force arm of the cantilever electromagnet on the electromagnetic disk;

B3 is the intensity of magnetization of the magnet on the electromagnetic disk:

B4 is the intensity of magnetization of the rail.

The above formula indicates that, the factors affecting the magnetic suspension force of the dynamic magnetic suspension propeller are more than the conventional magnetic suspension train. In other words, to work of change the magnetic suspension force, the dynamic magnetic suspension propeller has more choices.

For example, if the dynamic magnetic suspension propeller is equipped with an electromotor having a rotating speed of 3,000 r/m, and the force arm of the electromagnetic disk L=0.3 meter, the magnetic suspension force is:

$$F2=K2*15*B3*B4$$

As described above, the magnetic suspension force of a conventional magnetic suspension train is:

$$F1=K1*B1*B2$$

Provided that K1 and K2 are substantially equal, and the intensity of magnetic induction B1*B2=B3*B4, $$F2=15\ F1$$

In other word, under equal intensity of magnetic induction, the dynamic magnetic suspension propeller produces 15 times stronger magnetic suspension force than the conventional magnetic suspension train, i.e., the dynamic magnetic suspension propeller needs only 7% intensity of magnetic induction of the conventional magnetic suspension train to obtain equal magnetic suspension force.

Based on the foregoing analysis, for a magnetic suspension train utilizing potential energy of the magnetic field, the only way to enhance the magnetic suspension force is to enhance the intensity of magnetic induction of the magnetic suspension train and the magnetic rails. However, the volume and weight of the magnet is increased unavoidably and countervails a part of the magnetic suspension force, and therefore the actual efficiency is limited.

The dynamic magnetic suspension propeller can enhance the magnetic suspension force with simplest way that is increasing the rotating speed of the motor without modifying other elements. For example, by increasing the rotating speed of the motor up to 10,000 r/m, the intensity of the magnetic suspension force will be enhanced for more than three times.

The key that the dynamic magnetic suspension propeller can transform the potential energy of the magnetic induction into the kinetic energy is the separate body motor, which is a novel driving structure and has the following character:

1. The rotor and the stator of the separate body motor have no mechanical relationship therebetween. The rotor can rotate and move within the magnetic field of the stator.

2. The rotor of the conventional motor rotates in the manner of force couple, while the rotor of the separate body motor rotates in the manner of torque. The separate body motor has been tested successfully.

Besides suspending the train body by magnetic force, it is more important for the magnetic suspension train to run on the rails balancedly. Regarding to a magnetic suspension force of a conventional magnetic suspension train, no matter repelling same poles or attracting opposite poles, large magnetic protecting walls must be arranged on two sides of the rails to avoid accidents caused by left and right swaying thereof.

Regarding to the unique mechanical principle of the dynamic magnetic suspension propeller, the magnetic suspension train thereof has the character of middle auto-aligning inherently without any assistant device. The unusual advantage make the entire magnetic suspension system very simple and reliable.

What is claimed is:

1. A dynamic magnetic suspension propeller, comprising: an separate body electromotor and an external force to reversely rotate said separate body electromotor,
wherein said separate body electromotor comprises a stator and a rotor mounted separately, wherein said stator comprises a single layer plane magnetic path having magnetism, said rotor comprises a cantilever electromagnet having a first pole provided at an end portion of said cantilever and a second pole provided at a rotating shaft close to said cantilever, wherein said electromagnet is reversely rotated by said external force around said rotating shaft with respect to said stator, so as to produce a countertorque with respect to an magnetic force of said stator, wherein said countertorque comprises a magnetic suspension force and a magnetic propelling force,
wherein said rotor comprises a magnetic force transferred rotor,
wherein said magnetic force transferred rotor consists of a rotating canister and a magnet mounting on a frame, wherein said magnet is positioned on an inner side of said rotating canister, and magnetic lines of force thereof pass through an air gap into said rotating canister and then return to another pole of said magnet to form an integrated magnetic loop.

2. The dynamic magnetic suspension propeller, as recited in claim 1, wherein a magnetic source of said magnetic force transferred rotor is electromagnet or permanent magnet.

3. The dynamic magnetic suspension propeller, as recited in claim 1, wherein said rotating canister of said magnetic force transferred rotor comprises a canister shaped object made by a non-iron magnetic material, and a plurality of fan-shaped embedded blocks, which are made of iron magnetic material, are mounted evenly on said canister.

4. The dynamic magnetic suspension propeller, as recited in claim 1, wherein said rotating canister of said magnetic force transferred rotor is assembled by a plurality of disks which have a plurality of fan-shaped embedded blocks of iron material evenly mounted on said canister.

5. The dynamic magnetic suspension propeller, as recited in claim 1, wherein said stator further comprises a channel steel shaped rail or a V shaped rail or a U shaped rail or a parabola shaped rail which have magnetism.

6. The dynamic magnetic suspension propeller, as recited in claim 5, wherein said rail is single rail type or double rails type or multiple rails type, wherein said rail is single line type or double lines type or multiple lines type, wherein said channel steel shaped rail is mounted with a channel bottom thereof as a datum plane which is parallel or perpendicular or formed an angle to a horizontal.

7. The dynamic magnetic suspension propeller, as recited in claim 1, wherein said rotor comprises a plurality of cantilever electromagnets provided evenly on a plane of said rotating shaft to form a disk electromagnet.

8. The dynamic magnetic suspension propeller, as recited in claim 7, wherein said rotor comprises a plurality of disk electromagnets connected in series overlappedly and staggeredly.

9. The dynamic magnetic suspension propeller, as recited in claim 1, wherein said rotating shaft of said rotor is parallel to or laterally perpendicular to or laterally formed an angle with said rail lengthways.

10. The dynamic magnetic suspension propeller, as recited in claim 1, wherein said external force comprises rotating said rotor reversely with a conventional motor, wherein said conventional motor and said rotor have said same rotating shaft.

11. The dynamic magnetic suspension propeller, as recited in claim 1, wherein said external force comprises rotating said rotor reversely with said conventional motor via a gearing.

12. The dynamic magnetic suspension propeller, as recited in claim 1, wherein said magnetic suspension force and a magnetic propelling force comprises rotating said rotor reversely under said external force, when said rotating shaft of said rotor produces a countertorque which is separated into a horizontal subtorque and a perpendicular subtorque, wherein after eliminating said horizontal subtorque, said perpendicular subtorque is said magnetic suspension force, and after eliminating said perpendicular subtorque, said horizontal subtorque is said magnetic propelling force.

13. The dynamic magnetic suspension propeller, as recited in claim 1, wherein a magnetism of said stator is realized by permanent magnet type, traditional electromagnet type or electromagnetic induction by synchronical moving.

14. The dynamic magnetic suspension propeller, as recited in claim 13, wherein said electromagnetic induction by synchronical moving has a magnetic field of a magnetic path provided by a permanent magnet fixed on a magnetic suspension train.

15. The dynamic magnetic suspension propeller, as recited in claim 13, wherein said electromagnetic induction by synchronical moving has a magnetic field of a magnetic path provided by an electromagnet fixed on a magnetic suspension train.

16. The dynamic magnetic suspension propeller, as recited in claim 13, wherein said electromagnetic induction by synchronical moving has a magnetic field of a magnetic path provided by a conductive coil on a magnetic suspension train, and magnetic lines of force form an integrated magnetic loop via said rail.

* * * * *